United States Patent
Mann et al.

(10) Patent No.: US 12,253,464 B2
(45) Date of Patent: Mar. 18, 2025

(54) HIGH FREQUENCY DETECTION METHOD AND APPARATUS

(71) Applicant: Thruvision Limited, Abingdon (GB)

(72) Inventors: Christopher Mark Mann, Cornwall (GB); Stefan Matthew Hale, Oxon (GB); Leslie Owen Green, Norfolk (GB); Stephen Paul Haworth, Berks (GB)

(73) Assignee: Thruvision Limited, Abingdon (GB)

( * ) Notice: Subject to any disclaimer, the term of this patent is extended or adjusted under 35 U.S.C. 154(b) by 293 days.

(21) Appl. No.: 17/768,985

(22) PCT Filed: Oct. 16, 2020

(86) PCT No.: PCT/IB2020/059775
§ 371 (c)(1),
(2) Date: Apr. 14, 2022

(87) PCT Pub. No.: WO2021/074888
PCT Pub. Date: Apr. 22, 2021

(65) Prior Publication Data
US 2023/0144266 A1 May 11, 2023

Related U.S. Application Data

(60) Provisional application No. 62/916,596, filed on Oct. 17, 2019.

(51) Int. Cl.
*G01N 21/3581* (2014.01)
*G01N 21/17* (2006.01)
*G01N 21/21* (2006.01)

(52) U.S. Cl.
CPC ......... *G01N 21/3581* (2013.01); *G01N 21/21* (2013.01); *G01N 2021/1772* (2013.01)

(58) Field of Classification Search
None
See application file for complete search history.

(56) References Cited

U.S. PATENT DOCUMENTS 4,352,209 A * 9/1982 Ma ..................... H03B 5/1203
455/189.1
4,418,429 A * 11/1983 Roberts ................ H01Q 1/247
455/328

(Continued)

FOREIGN PATENT DOCUMENTS

| CA | 2975687 A1 | 2/2019 |
| EP | 3686577 A1 | 7/2020 |

(Continued)

OTHER PUBLICATIONS

International Preliminary Report on Patentability issued in International Application No. PCT/IB2020/059775, dated Apr. 19, 2022 (16 pages).

(Continued)

*Primary Examiner* — David P Porta
*Assistant Examiner* — Djura Malevic
(74) *Attorney, Agent, or Firm* — Rothwell, Figg, Ernst & Manbeck, P.C.

(57) ABSTRACT

A detection system and method using multiple detector arrays for single or multi-frequency imaging of an object or scene, with one or more channels arranged along perpendicular axes. A polarizing beam element can be arranged to pass or reflect radiation to first and second detector blocks of the detection system.

20 Claims, 15 Drawing Sheets

(56) References Cited

U.S. PATENT DOCUMENTS

| | | | | |
|---|---|---|---|---|
| 4,485,488 A * | 11/1984 | Houdart | | H03D 7/1408 455/330 |
| 4,641,369 A * | 2/1987 | Grote | | H03B 9/147 455/328 |
| 5,325,129 A * | 6/1994 | Henry | | H04N 5/30 348/E5.085 |
| 5,452,118 A * | 9/1995 | Maruska | | G02B 6/12004 398/164 |
| 5,465,417 A * | 11/1995 | Tanbakuchi | | H03J 3/16 455/330 |
| 5,493,303 A | 2/1996 | Kolak | | |
| 6,348,830 B1 * | 2/2002 | Rebeiz | | H03D 7/1425 327/359 |
| 6,370,372 B1 * | 4/2002 | Molnar | | H04B 1/30 455/333 |
| 6,662,001 B1 * | 12/2003 | Roth | | H03D 7/16 455/314 |
| 6,686,879 B2 * | 2/2004 | Shattil | | H04L 27/2601 342/367 |
| 6,725,029 B1 * | 4/2004 | Allen | | H03D 9/0608 455/302 |
| 6,965,655 B1 * | 11/2005 | Mostov | | H03G 11/00 375/345 |
| 7,065,326 B2 * | 6/2006 | Lovberg | | H04B 1/52 455/562.1 |
| 7,130,604 B1 * | 10/2006 | Wong | | H03D 7/12 455/302 |
| 7,164,902 B2 * | 1/2007 | Yamada | | H03D 9/0633 455/330 |
| 7,167,698 B2 * | 1/2007 | Katz | | H04B 1/30 455/333 |
| 7,450,051 B1 * | 11/2008 | Valentine | | H03D 7/1408 342/115 |
| 7,570,936 B2 * | 8/2009 | Vice | | H03D 7/125 455/333 |
| 7,577,418 B2 * | 8/2009 | Chang | | H03D 7/165 327/119 |
| 7,860,473 B2 * | 12/2010 | Hardacker | | H04W 52/246 455/249.1 |
| 7,873,329 B2 * | 1/2011 | Mann | | H04B 1/40 385/8 |
| 7,933,576 B2 * | 4/2011 | Ji | | H03D 7/1425 455/326 |
| 8,063,366 B2 * | 11/2011 | Mann | | G01V 8/005 250/353 |
| 8,115,673 B1 * | 2/2012 | McEwan | | G01S 7/288 342/197 |
| 8,134,515 B2 * | 3/2012 | Mann | | H01Q 21/064 343/762 |
| 8,180,313 B2 * | 5/2012 | Kim | | H03D 7/1441 455/313 |
| 8,344,818 B1 * | 1/2013 | Gamliel | | H03D 7/1458 375/321 |
| 8,559,905 B2 * | 10/2013 | Buer | | H03D 7/02 455/114.1 |
| 8,693,973 B2 * | 4/2014 | Chattopadhyay | | H03D 9/0633 455/313 |
| 8,744,385 B2 * | 6/2014 | Yahav | | H03D 7/00 455/208 |
| 8,748,822 B1 * | 6/2014 | Gerecht | | G01N 21/3586 250/339.07 |
| 8,780,012 B2 * | 7/2014 | Llombart Juan | | H01Q 21/06 343/911 R |
| 8,792,820 B2 * | 7/2014 | Grotz | | H01Q 25/001 455/12.1 |
| 9,059,794 B2 * | 6/2015 | Diez | | H04B 17/345 |
| 9,118,356 B2 * | 8/2015 | Michalske | | H04B 5/79 |
| 9,341,697 B2 * | 5/2016 | Mahajan | | G01S 17/42 |
| 9,470,779 B2 * | 10/2016 | Stokes | | G01S 15/14 |
| 9,921,170 B2 * | 3/2018 | Pate | | G01J 3/453 |
| 10,135,137 B2 * | 11/2018 | Rao | | H01Q 21/0018 |
| 10,868,497 B2 * | 12/2020 | Wang | | H03B 19/05 |
| 11,038,493 B1 * | 6/2021 | Lakdawala | | H03B 19/12 |
| 11,189,907 B2 * | 11/2021 | Othmezouri | | H05K 1/144 |
| 11,316,475 B1 * | 4/2022 | Ku | | H03D 7/1408 |
| 11,448,593 B1 * | 9/2022 | Ensher | | G01J 3/10 |
| 11,923,904 B2 * | 3/2024 | Gunzelmann | | H04W 28/0215 |
| 2001/0036818 A1 * | 11/2001 | Dobrovolny | | H03D 7/1466 455/333 |
| 2001/0043127 A1 * | 11/2001 | Tanji | | H01P 5/1022 333/34 |
| 2002/0164946 A1 * | 11/2002 | Olsen | | G01V 8/005 455/561 |
| 2002/0164960 A1 * | 11/2002 | Slaughter | | H04B 10/1149 455/500 |
| 2003/0027530 A1 * | 2/2003 | Levitt | | H04B 1/50 455/73 |
| 2003/0036373 A1 * | 2/2003 | Yu | | H03D 7/1408 455/325 |
| 2003/0095018 A1 * | 5/2003 | Holme | | H01P 1/2082 333/209 |
| 2003/0156658 A1 * | 8/2003 | Dartois | | H03F 1/3247 375/297 |
| 2003/0224801 A1 * | 12/2003 | Lovberg | | H04B 10/40 455/454 |
| 2004/0002319 A1 * | 1/2004 | Lin | | G10H 5/002 455/313 |
| 2004/0002320 A1 * | 1/2004 | Lin | | G10H 5/002 455/313 |
| 2004/0085153 A1 * | 5/2004 | Fukunaga | | H01P 5/107 333/33 |
| 2004/0121751 A1 * | 6/2004 | Shen | | H03D 7/1475 455/313 |
| 2004/0209584 A1 * | 10/2004 | Bargroff | | H03D 7/1425 455/180.1 |
| 2004/0214547 A1 * | 10/2004 | Kim | | H03D 7/1433 455/296 |
| 2005/0020231 A1 * | 1/2005 | Yamada | | H03D 9/0633 455/313 |
| 2005/0176398 A1 * | 8/2005 | Maeda | | H03D 7/1475 327/359 |
| 2005/0219007 A1 * | 10/2005 | Tsai | | H01P 1/203 333/26 |
| 2006/0049980 A1 * | 3/2006 | Archer | | H01Q 3/18 342/179 |
| 2006/0148439 A1 * | 7/2006 | Chiu | | H03D 7/165 455/313 |
| 2006/0152290 A1 * | 7/2006 | Lee | | H03L 7/113 331/16 |
| 2006/0239384 A1 * | 10/2006 | Le Naour | | H03D 7/163 375/327 |
| 2007/0040735 A1 * | 2/2007 | Matsuo | | H01L 23/552 257/E23.114 |
| 2007/0111661 A1 * | 5/2007 | Bargroff | | H04N 7/102 455/131 |
| 2007/0249292 A1 * | 10/2007 | Mann | | H04B 1/40 455/73 |
| 2008/0032659 A1 * | 2/2008 | Chang | | H03D 7/1475 455/323 |
| 2008/0084357 A1 * | 4/2008 | Smeltzer | | H01Q 3/02 343/757 |
| 2008/0132194 A1 * | 6/2008 | Ji | | H03D 7/1441 455/326 |
| 2008/0169859 A1 * | 7/2008 | Garcia | | H03D 7/1491 327/355 |
| 2008/0251733 A1 * | 10/2008 | Anderton | | G01V 8/005 250/394 |
| 2009/0028216 A1 * | 1/2009 | Gresham | | H04B 1/7174 375/130 |
| 2009/0039943 A1 * | 2/2009 | Kim | | H03D 7/1441 327/361 |
| 2009/0065696 A1 * | 3/2009 | Mann | | H04B 1/40 250/339.02 |
| 2009/0115676 A1 * | 5/2009 | Mann | | H03D 9/0641 343/786 |
| 2009/0203345 A1 * | 8/2009 | Sorrells | | H03D 7/1441 455/313 |

(56) References Cited

U.S. PATENT DOCUMENTS

| | | | | |
|---|---|---|---|---|
| 2009/0273517 | A1* | 11/2009 | Thiesen | H01Q 21/065 342/372 |
| 2010/0108891 | A1* | 5/2010 | Cox | G02B 5/0816 250/341.8 |
| 2010/0110447 | A1* | 5/2010 | Cox | G01N 21/3504 356/519 |
| 2010/0298709 | A1* | 11/2010 | Needles | G01S 15/8956 600/458 |
| 2010/0328779 | A1* | 12/2010 | Llombart Juan | H01Q 19/09 359/619 |
| 2011/0111692 | A1* | 5/2011 | Grotz | H04B 1/18 455/3.02 |
| 2012/0280742 | A1* | 11/2012 | Chattopadhyay | H03D 7/02 257/E21.359 |
| 2013/0045696 | A1* | 2/2013 | Skafidas | H03D 7/165 455/256 |
| 2013/0202020 | A1* | 8/2013 | Diez | H04B 17/0085 455/115.2 |
| 2013/0234879 | A1* | 9/2013 | Wilson-Langman | G01S 13/885 342/21 |
| 2013/0342841 | A1* | 12/2013 | Mahajan | G01S 3/783 356/369 |
| 2014/0037045 | A1* | 2/2014 | Dafni | A61B 6/032 250/394 |
| 2014/0286131 | A1* | 9/2014 | Stokes | G01S 7/526 367/87 |
| 2014/0300430 | A1* | 10/2014 | Feldman | H01P 5/1015 333/4 |
| 2016/0006098 | A1* | 1/2016 | Hasegawa | H01P 5/16 455/286 |
| 2016/0131600 | A1* | 5/2016 | Pate | G01N 22/00 250/339.08 |
| 2016/0228006 | A1* | 8/2016 | Zimmermann | A61B 6/025 |
| 2016/0248157 | A1* | 8/2016 | Rao | H01Q 3/2694 |
| 2016/0305869 | A1* | 10/2016 | Mann | G01N 21/952 |
| 2017/0138847 | A1* | 5/2017 | Pate | G01J 3/42 |
| 2017/0184719 | A1* | 6/2017 | Stokes | G01S 7/526 |
| 2017/0237399 | A1* | 8/2017 | Convert | H03D 7/02 327/355 |
| 2020/0217789 | A1* | 7/2020 | Muta | G07D 7/06 |
| 2020/0284716 | A1* | 9/2020 | Kovacs | G01N 21/62 |
| 2022/0337292 | A1* | 10/2022 | Jain | H04B 7/0413 |
| 2022/0370010 | A1* | 11/2022 | Zilkie | G02B 6/12007 |
| 2023/0089039 | A1* | 3/2023 | Hartin | H01S 5/0602 250/503.1 |

FOREIGN PATENT DOCUMENTS

| | | |
|---|---|---|
| GB | 2284941 A | 6/1995 |
| JP | H08-204445 A | 8/1996 |
| JP | 2009-534975 A1 | 9/2009 |
| JP | 2019-60841 A | 4/2019 |
| WO | 2007/125326 A1 | 11/2007 |

OTHER PUBLICATIONS

Canadian Office Action issued in corresponding Canadian Application No. 3,156,477, dated Jun. 6, 2024 (4 pages).

Japanese Office Action issued in corresponding Japanese Application No. 2022-523154, dated Apr. 2, 2024, with an English language translation (13 pages).

International Search Report and Written Opinion issued in International Application No. PCT/IB2020/059775, dated Mar. 19, 2021 (22 pages).

C. H. Smith III et al., "Development of a Multi-Layer SU-8 Process for Terahertz Frequency Waveguide Blocks", 2005 IEEE MTT-S International Microwave Symposium, IEEE, Jun. 12, 2005 (Jun. 12, 2005), p. 439-442.

International Search Report and Written Opinion issued in International Application No. PCT/IB2020/059777, dated Mar. 18, 2021 (16 pages).

L. E. Dickens et al., "A New 'Phased-Type' Image Enhanced Mixer", Microwave Symposium, 1975 IEEE-MTT-S International, IEEE, May 12, 1975 (May 12, 1975), pp. 149-151.

Ashok Kumar et al., "Millimetre-Wave Single Side Band Upconverter in Hybrid Transmission Media" International Journal of Electronics, vol. 73, No. 2, Aug. 31, 1992 (Aug. 31, 1992), pp. 407-415.

Anthony Kerr et al., "Development of the ALMA Band-3 and Band-6 Sideband-Separating SIS Mixers", IEEE Transactions on Terahertz Science and Technology, IEEE, vol. 4, No. 2, Mar. 31, 2014 (Mar. 31, 2014), pp. 201-212.

\* cited by examiner

HIGH FREQUENCY DETECTION METHOD AND APPARATUS

CROSS REFERENCE TO RELATED APPLICATION(S)

This application is a 35 U.S.C. § 371 National Stage of International Patent Application No. PCT/IB2020/059775, filed Oct. 16, 2020, designating the United States, which claims the benefit of U.S. Provisional Application Ser. No. 62/916,596, filed Oct. 17, 2019, the disclosures of which are incorporated herein in their entirety by reference.

TECHNICAL FIELD

This disclosure relates to high frequency electronic systems, and in particular, detection systems and methods of manufacturing and using the same.

BACKGROUND

High frequency systems can be used to generate an image through the detection of radiation received from an object or scene, followed by processing of the detected radiation. Both active and passive imaging systems exist. In active imaging, a radiation source (e.g., a terahertz source) can be used to illuminate an object or field of view and provide radiation for detection. In passive imaging, there is no illuminating source. Rather, the system receives the radiation emitted from an object or scene itself. The detected radiation can be at a single frequency (e.g., a band centered about a single frequency), or in some instances, at multiple frequencies (e.g., in multiple distinct or overlapping bands).

A multi-frequency imaging method and apparatus is provided in WO 2013/117920, which describes an imaging system that has a least one terahertz receiver adapted to receive radiation at different frequencies over the same period of time, an image processor, and a composite image generator. The image processor provides image data with respect to the field of view at each respective frequency, and the composite image generator generates composite image data with respect to a common area from at least part of the image data provided by the image processor.

Also, a field of view can be scanned, for instance, using a scanning mirror or reflector to direct radiation towards one or more detector arrays. As described in UK Patent Application GB 2519233, a terahertz detection apparatus may include one or more detectors and a scanning mechanism for scanning a field of view that comprises: (i) a detection system for locating objects of interest; and (ii) a steering mechanism that can receive a control signal based at least partly on a detection system output and send a steering signal for use in steering the scanning mechanism.

However, there remains a need for improved detection systems and methods that can fully utilize available radiation from a source or scene to provide optimized imaging in an efficient and scalable arrangement, while maintaining any necessary spatial alignment requirements. Additionally, there remains a need for systems with layouts and components that can be effectively machined.

SUMMARY

According to embodiments, a detection system is provided that comprises a first detector array, a second detector array, and a polarizing element, such as a polarizing plate, that is interposed between the first and second detector arrays. The polarizing plate is arranged to pass a first radiation signal having a first polarization to the first detector array and reflect a second radiation signal having a second polarization to the second detector array. In some embodiments, the polarizing plate comprises a wire grid at a 45 degree angle to the first and second detector arrays, and the first polarization is a vertical polarization and the second polarization is a horizontal polarization.

According to some embodiments, a system is provided that comprise a first electronic device, a second electronic device, a power source, and a non-equal power splitter. In certain aspects, the power source is coupled via waveguide to an input of the non-equal power splitter and delivers a power signal (e.g., a local oscillator signal) to the non-equal power splitter. Additionally, a first output of the non-equal power splitter is coupled via waveguide to the first electronic device and a second output of the non-equal power splitter is coupled via waveguide to the second electronic device. In some embodiments, the non-equal power splitter is configured to provide a first portion of the power signal through the first output and a second portion of the power signal through the second output, where the first portion is larger than the second portion. The non-equal power signals may be used to drive one or more frequency multipliers that have differing levels of efficiency.

According to some embodiments, a detection system is provided. The detection system comprises, for instance, a first detector block, a local oscillator (LO) source, and one or more intermediate frequency (IF) processing circuits. In some embodiments, the first detector block comprises one or more heterodyne mixer elements; one or more LO input waveguide channels configured to provide an LO signal from the LO source to the one or more heterodyne mixer elements; one or more waveguide feedhorns configured to provide detected radio frequency (RF) signals to the one or more heterodyne mixer elements; and one or more IF output channels configured to provide IF signals from the one or more heterodyne mixer elements to the one or more IF processing circuits. The one or more waveguide feedhorns and the one more LO input waveguide channels extend along a first axis of the first detector block and the one or more IF output channels extend along a second axis of the first detector block, where the first axis and the second axis are perpendicular. According to embodiments, input channels and output channels are in orthogonal planes. While described as perpendicular in some examples, some embodiments may include IF output channels that are in different, non-orthogonal planes than the waveguide feedhorns and/or LO inputs.

According to embodiments, a detection system is provided that comprises a first detector array block and a second detector array block stacked on the first detector array block. In this example, the first and second detector block arrays each comprise at least one signal input extending along a first axis, at least one power input extending along the first axis, and at least one signal output extending along a second axis, where the first axis and the second axis are perpendicular. In certain aspects, each of the first and second detector block arrays comprises one or more stacking notches. The first and second detector blocks arrays may also be identical modular units. Additionally, the one or more signal inputs for each of the first and second detector array blocks may comprise at least two rows of feedhorns and at least two columns of feedhorns (e.g., 2×2 or 2×4 arrays).

According to embodiments, a detection module is provided for a scalable imaging system. The module may comprise one or more signal inputs that extend along a first axis; one or more power inputs that extend along the first axis; one or more signal outputs that extend along a second axis; and a first stacking notch, were the first axis and the second axis are perpendicular. In certain aspects, the signal inputs comprise one or more radio frequency feedhorns, the power inputs comprise one or more local oscillator channels, and the signal outputs comprise one or more intermediate frequency output channels. According to embodiments, the feedhorns and oscillator channels are in a first plane, while the IF channel is in a second, orthogonal plane. The module may further comprise a second stacking notch, and both notches may be angled. In some embodiments, the module is a block that comprises a first side, a second side, a third side, a fourth side, a fifth side, and a sixth side where the first and second sides are opposite sides of the detection module, the third and fourth sides are opposite sides of the detection module, and the fifth and six sides are opposite sides of the detection module. Additionally, in some embodiments, the one or more signal inputs are located on the first side, the one or power inputs are located on the second side, the one or more signal outputs are located on the third or fourth side; the first stacking notch is located on a fifth side, and the second stacking notch is located on the sixth side.

According to embodiments, a detection method is provided. The method may comprise the steps of receiving at a first detector block of a camera a first radiation signal having a first polarization, wherein the first radiation signal is received through a polarization plate from a radiation source; receiving at a second detector block of the camera a second radiation signal having a second polarization, wherein the second radiation signal is received from the radiation source as a reflected signal from the polarization plate; processing the first radiation signal to form first detection information; and processing the second radiation signal to form second detection information. In some embodiments, the method includes passing at least one of the first and second received radiation signals through a polarization rotation element before the processing.

According to some embodiments, a method of manufacturing a detector block is provided. The method may comprise the steps of machining a first housing component comprising a first radio frequency (RF) channel portion, a first local oscillator (LO) channel portion, a first intermediate frequency (IF) channel portion, a polarization rotation portion, and a first mixer mounting cavity; and machining a second housing component comprising a second radio frequency (RF) channel portion, a second local oscillator (LO) channel portion, a second intermediate frequency (IF) channel portion, a polarization rotation portion, and a second mixer mounting cavity. Additional steps may include mounting a heterodyne mixer in the first and/or second mounting cavity; and attaching the first housing component to the second housing component to form a first detector block. Additionally, and in some instances, the first RF channel portion and the first LO channel portion are machined along a first axis of the first housing component and the first IF channel portion is machined along a second, perpendicular axis of the first housing, and the second RF channel portion and the second LO channel portion are machined along a first axis of the second housing component and the second IF channel portion is machined along a second, perpendicular axis of the second housing. Attaching a second detector block to the first detector block can form an integrated array.

BRIEF DESCRIPTION OF THE DRAWINGS

The accompanying drawings, which are incorporated herein and form part of the specification, illustrate various embodiments.

DETAILED DESCRIPTION

In the security sector, the detection and identification of threats carried by people is a critical area of interest. In particular, there remains a need for a system that can achieve detection at a significant distance, in an outdoor environment, and in real-time so that the threat can be resolved before escalation. However, and particularly for a passive system, such detection and identification may require the ability to deal with changing outdoor weather, atmospheric, geographic and seasonal conditions. Aspects of this disclosure address these needs using a detector setup and geometry that enables maximum signal capture while maintaining the temporal and spatial alignments desired for real-time threat analysis. Systems and methods described herein can be used for the detection and identification of weapons, threats, illicit goods, and stolen items, and may be deployed in an indoor or outdoor environment.

According to embodiments, a polarizing beam combiner is used to align and overlay one or more detectors' field of view, which is used in conjunction with a waveguide polarization rotator and adjustable local oscillator power to allow the use of a wide range of frequencies while simultaneously reducing cost and providing a compact and configurable front end receiver module layout. Aspects of the disclosure enable the use of multiple frequencies, or the simultaneous capture of dual polarized single-frequency data, or any combination of the above. For instance, some embodiment may be used for capturing data using 1-4 frequencies.

Figure 1A:
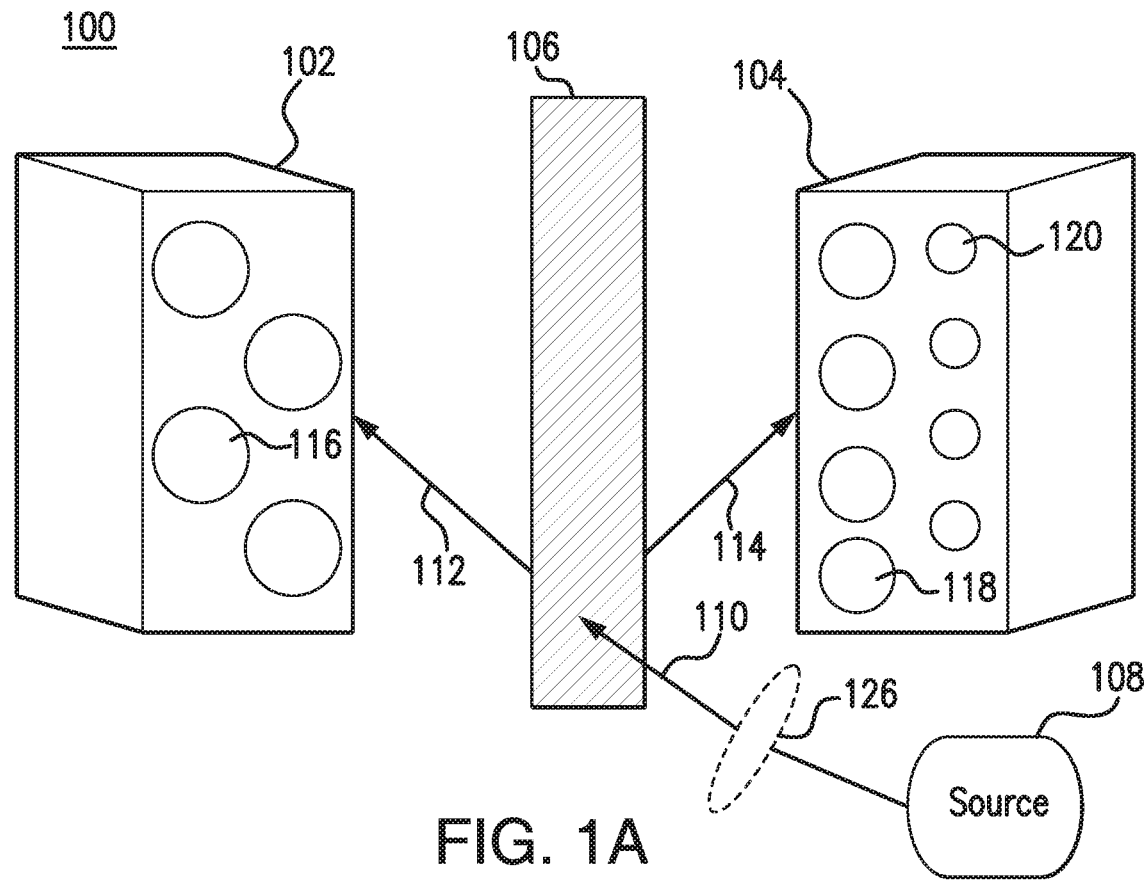
FIGS. 1A and 1B illustrate a detection system according to some embodiments.
Figure 1B:
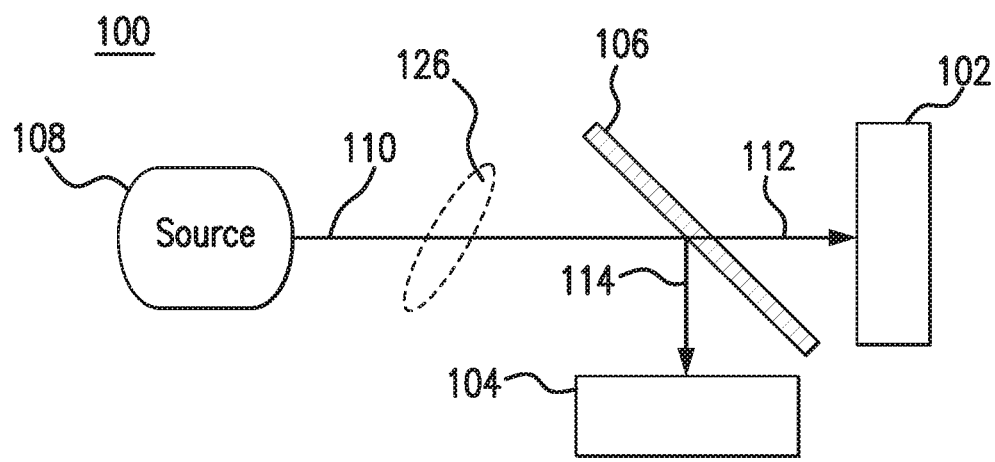

FIGS. 1A and 1B show a detection system 100 according to some embodiments. The system may be, for example, a high-frequency detection system such as a terahertz camera. FIG. 1B shows a top-view depiction of the system 100 shown in FIG. 1A.

Referring now to FIG. 1A, the system 100 can include a first detector array 102, a second detector array 104, and a polarizing element 106, such as a polarizing plate. As shown in FIG. 1A, the polarizing plate 106 may be interposed between the detector arrays 102, 104 such that it passes and/or reflects radiation signals 110 from a source 108 to the detector arrays 102, 104. According to embodiments, a first radiation signal 112 having a first polarization (e.g., a vertical polarization) is passed through the polarizing plate 106 to the first detector array 102, and a second radiation signal 114 having a second polarization (e.g., a horizontal polarization) is reflected from the polarizing plate 106 to the second detector array 104. In the illustration of FIGS. 1A and 1B, both radiation signals are from source 108, which can be, for example, one or more human beings emitting radiation 110 towards the detection system 100. Other sources may include, for instance, single objects of interest such as a vehicle or a structure, or entire scenes having multiple objects. Additionally, the radiation signal 110 from source 108 may actually originate from a secondary source (not shown), as in an active detection system. In this case, the signal 110 may reflect from source 108 towards system 100. That is, system 100 may be part of a passive or active detection implementation.

Figure 12A:
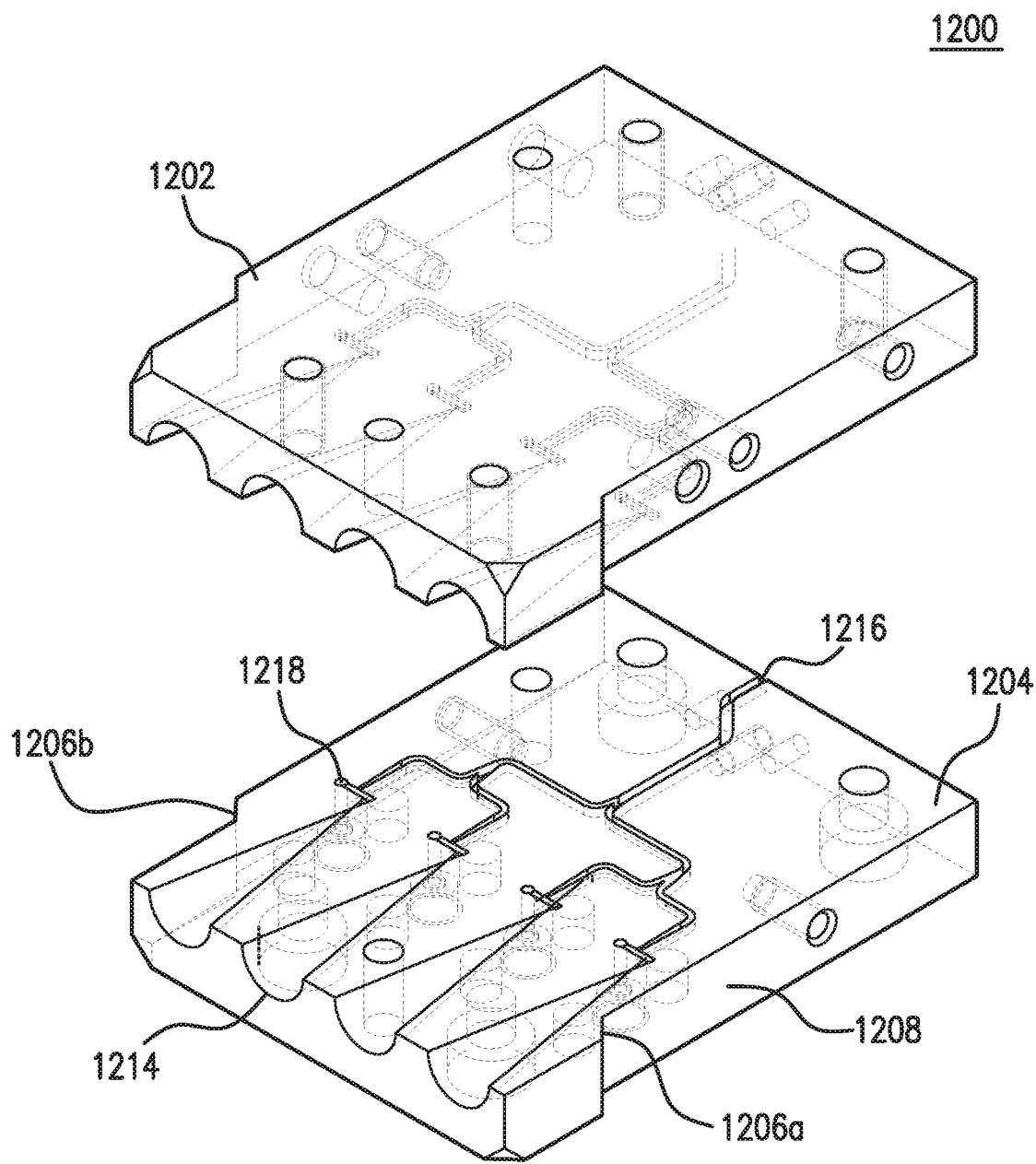
FIGS. 12A-12C illustrate detector blocks and assembly processes according to some embodiments.
Figure 12B:
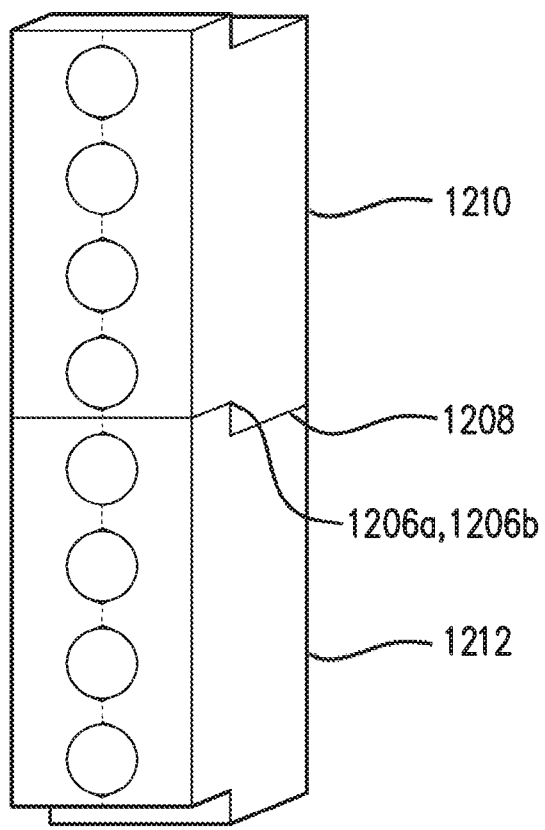
Figure 12C:
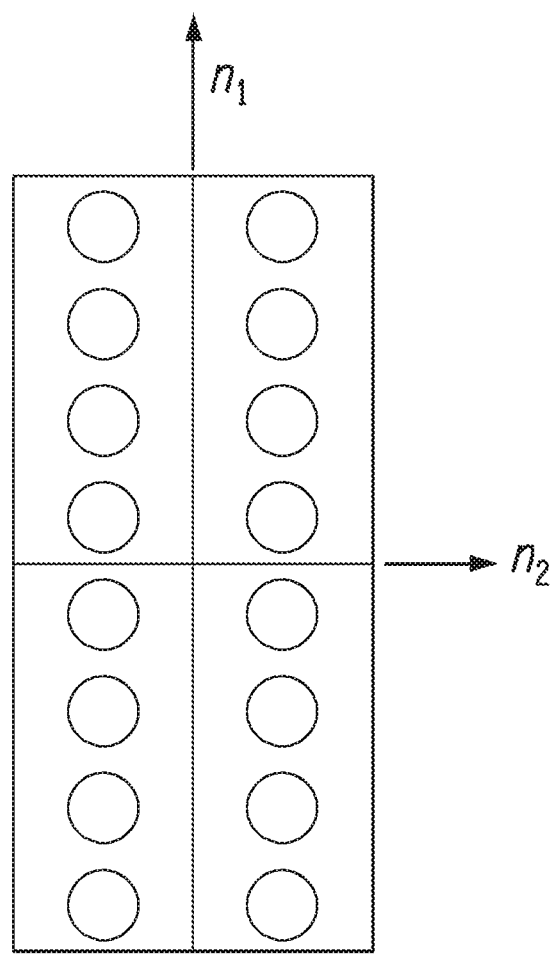

According to some embodiments, the system 100 does not require any optical elements interposed between the polarizing plate 106 and either of the first or second detector arrays 102,104. While illustrated in FIGS. 1A and 1B with two detector array blocks 102, 104, additional array blocks may be used in system 100, for instance, on top of or adjacent to arrays 102, 104. Moreover, while system 100 is illustrated with detector array blocks 102, 104 spaced apart, in some embodiments, these arrays may be joined. For instance, in some embodiments, detector array block 102 may be stacked on top of array block 104, or placed directly adjacent to and connected with block 104, as illustrated in FIGS. 12A-12C. In such cases, use of a polarizing plate 106 may not be necessary.

Each of the detector arrays 102, 104 may comprise one or more input channels, such as feedhorns 116, 118, 120. According to embodiments, the feedhorns capture radiation from source 108 and pass the received signal into other portions of the system for subsequent processing. For instance, feedhorns 116 can capture radiation 112 passed through polarization plate and feedhorns 118 and 120 may capture radiation 114 reflected from polarization plate 106. Although depicted as circular waveguide in this example, other forms of waveguide (e.g., oval or rectangular waveguide) may be used as well.

According to some embodiments, the first detector array comprises a first plurality of feedhorns having a first width and a having spacing equal to or greater than the first width, and the second detector array comprises a second plurality of feedhorns having a second width and having a spacing equal to or greater than the second width. That is, the feedhorns may be substantially spaced apart. Additionally, first processing circuitry can be located between feedhorns of the first detector array, and second processing circuitry is located between feedhorns of the second detector array.

While depicted as 2×2 and 2×4 arrays, respectively, in FIG. 1A, the first detector array 102 may have more than two feedhorns in each of a horizontal and vertical direction of the array, and similarly, the second detector array 104 may have more than two feedhorns in each of a horizontal and vertical direction of the array. According to embodiments, the detector array blocks 102, 104 may be formed of multiple sub-blocks, for instance, as illustrated in FIGS. 4A, 4B, and 12A-12C.

As shown in FIG. 1B, and according to some embodiments, the polarizing plate 106 may be aligned at a 45 degree angle to each of the first and second detector arrays 102, 104. However, the plate 106 may be aligned at different angles in certain arrangements, for instance, to account for the particular alignment or spacing of one or more of detectors 102, 104. That is, the polarizing plate may aligned at an angle greater than or less than 45 degrees. In some embodiments, the polarizing plate comprises a wire grid structure. In this example, the wire grid acts to pass vertically polarized radiation 112 from the source 108, while horizontally polarized radiation from the source 108 is reflected. Although described with a wire grid and horizontal/vertical polarizations, in some instances, multi-layer dielectric polarizer plates and frequency selective surfaces may be used. Although illustrated as flat plate, the polarizing plate 106 need not have flat surfaces, and could take the form of a lens or other curved structure. According to embodiments, a polarizing element (e.g., 106) has a low insertion loss in both the pass-through mode and in the reflection mode. In certain aspects, the polarization element acts as a free-space polarization duplexer or orthomode transducer.

As shown in FIGS. 1A and 1B, the system may further include a scanning mechanism 126. The scanning mechanism 126 may be based on one or more movable mirrors which reflect incoming radiation onto one or more detectors, such as arrays 102,104. An image may be recovered by scanning (e.g., moving) the mirror(s) so that the detector(s) effectively follow a scanning raster relative to the field of view. The mirror(s) might move so as to produce a scanning raster comprising spaced scan lines, and to produce the scanning raster, the mirror could move differently in different directions. For example, the mirror might reciprocate about a first axis to create scan lines coupled with a stepped rotation about a second axis to set the scan line spacing. Structurally, the scanning mechanism could, in some embodiments, comprise: (i) a mirror structure mounted for rotation about a first axis; (ii) an intermediate support structure for carrying the mirror structure, the intermediate support structure being mounted for rotation about a second axis; (iii) a base support structure for carrying the intermediate support structure; (iv) a mirror drive mechanism mounted in part on the intermediate support structure and in part on the mirror structure, for driving the mirror structure to rotate about the first axis; and (v) an intermediate drive mechanism mounted in part on the base support structure and in part on the intermediate support structure for driving the intermediate support structure to rotate about the second axis, whereby the mirror structure can be driven to rotate about either one or both of the first and second axes. The mirror itself may be a thin, metal (e.g., aluminum) mirror comprising a thin (e.g., 0.5 mm) sheet with or without reinforcing ribs.

An adaptive scanning mirror may be used to scan a field of regard in successive detections of the field of view. "Field of view" in this context is intended to refer to the area of a scene being viewed, or sensed, either by the detection system or by the one or more of the detector elements. That is, it is intended to refer to the area of a scene that is currently being imaged or sensed by the detectors due to, for instance, movement of the scanning mirror(s). For example, in imaging to give successive frames in relation to a scene, each frame will show the field of view. "Field of regard" in this context is intended to refer to the largest area of the scene that could he accessible to the system/detectors by steering the scanning mirror(s) without moving the detectors. With respect to the detection system 100, the field of regard refers to the angular range within which the detection system is capable of detecting objects of interest. According to embodiments, the detector outputs are converted to graphical data to support screen-based representations of the detected fields of view, and may, for example, be combined to form a composite image of the field of regard. Additionally, fields of view in different bands may be combined to form a composite image of a field of view.

Figure 2A:
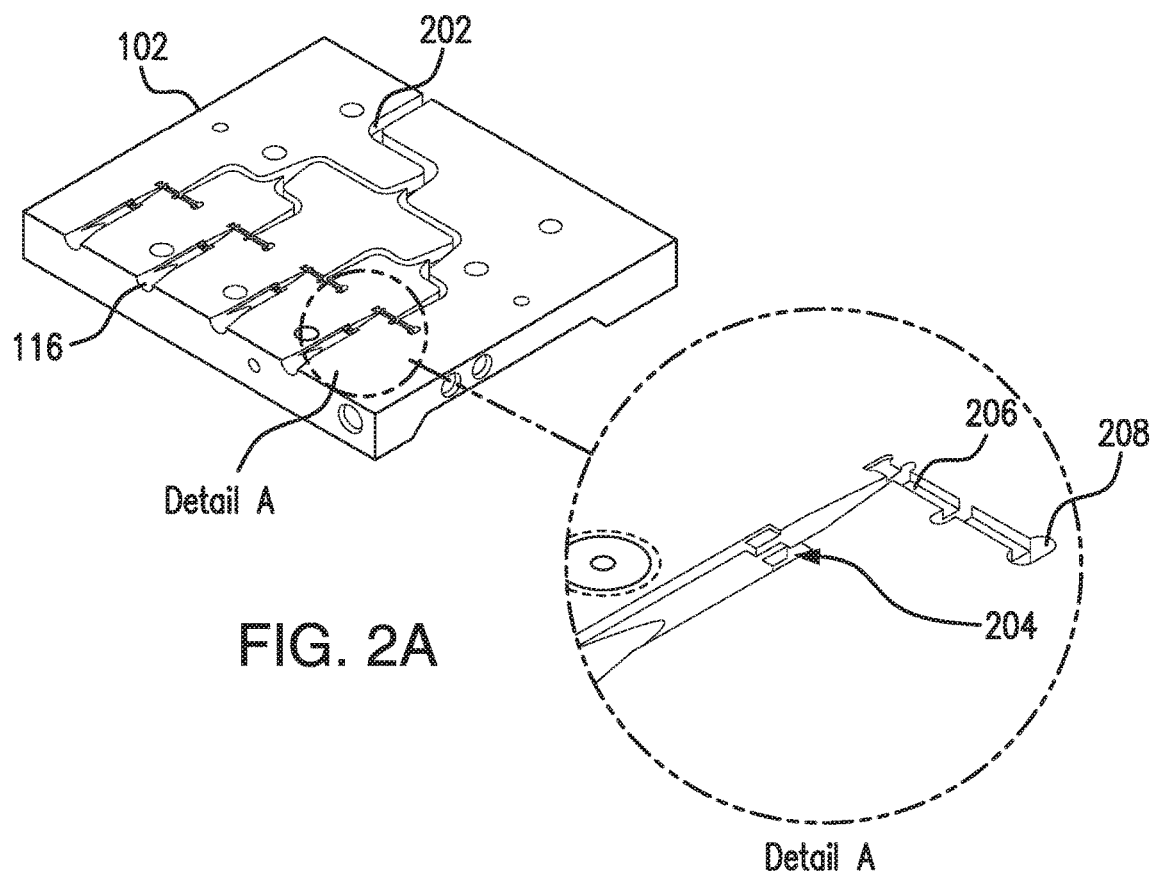
FIGS. 2A, 2B, and 2C illustrate waveguide portions according to some embodiments.

Referring now to FIG. 2A a cross-sectional view of a portion of detector array 102 is shown according to some embodiments. Portions of various waveguide channels according to embodiments, including feedhorn 116 and local oscillator (LO) channel 202, are shown. Further, Detail A shows a polarization rotation element 204, which can be located in one or more channels, such as in the channel of feedhorn 116 or the connected waveguide for the RF path according to some embodiments. The polarization element 204 can rotate the polarization of a signal along the channel (e.g., from horizontal to vertical polarization) or vice-versa) and may comprise multi-step mode conversion. This may be, for instance, to prepare the signal for subsequent processing or to reduce propagation losses along the length of the channel. The subsequent processing may be in a mixer stage 206, for example. According to embodiments, a three-step mode converter is provided where each step couples one mode from the former into the latter, thereby rotating the electric field orientation by approximately 30 degrees each step. According to some embodiments, a two-step rotation is provided, with 45 degree rotation at each step. FIG. 2A also illustrates a signal output 208, such as an IF signal, from the mixer stage 206, which would extend upward and/or downward and perpendicular to the plane of the feedhorns 116 and LO channel 202. That is, the output signal channel may be orthogonal to input signal channels (e.g., feedhorns and LO channels). According to embodiments, an IF output channel 208 may comprise a coaxial cable for carrying signal.

Figure 2B:
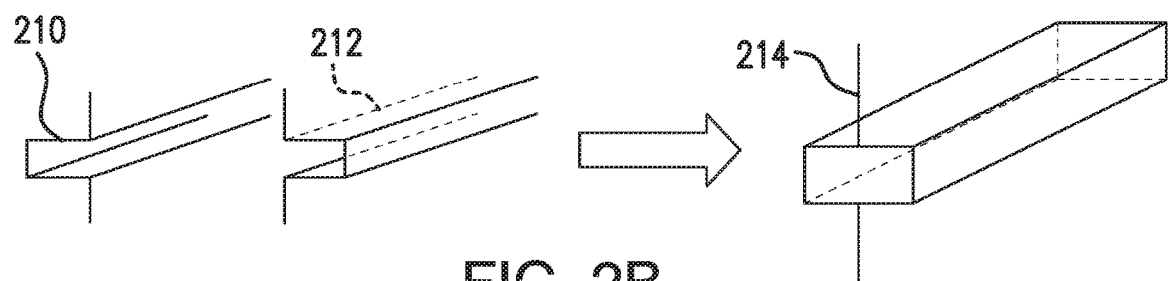
Figure 2C:
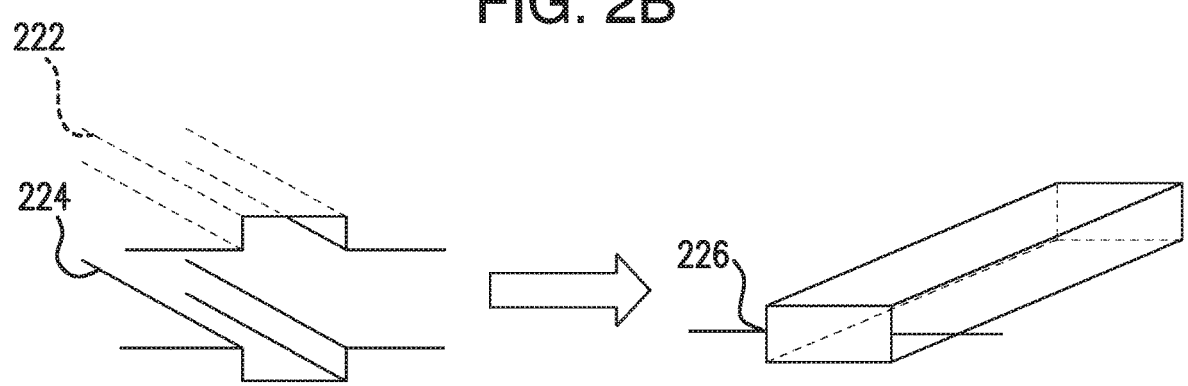

In some embodiments the waveguide, such as the channels of the detector arrays 102, 104, may be machined in two halves and then connected, as illustrated in FIGS. 2B and 2C. FIG. 2B illustrates low loss waveguide using mirrored half waveguide split along a top broad wall (i.e., along the wider cross-section) to reduce loss in some instances. In this example, a first half 210 is combined with a second half 212 to form waveguide having a split 214, such that the split is along the wider, top and bottom surfaces of the waveguide channel. In other instances, and as illustrated in FIG. 2C, a waveguide may be formed with a first half 222 and a second half 224 such that the split 226 is through the shorter, side walls of the resultant waveguide. In some arrangements, having the split 214 may result in less loss than having the split 226. Thus, and according to some embodiments, a rotation element 204 can be used to rotate a signal from a high-loss split waveguide (e.g., 226) to a low-loss split waveguide (e.g. 214). Depending on the input signal, the arrangement may be reversed.

Waveguide is most readily formed by machining slots of the appropriate dimensions into either face of a metal block. At higher frequencies, for instance above 30 GHz, it is often necessary to split the waveguide at the middle point of its broad wall in order to minimize ohmic losses as shown in FIG. 2B. This is because at higher frequencies ohmic losses dominate as the current flow, which is restricted by the skin effect, and thus, surface finish becomes very important. Additionally, the current in a rectangular waveguide travels along the broad wall and down the narrow wall. The propagating signal is therefore relatively unaffected by a small gap in the broad wall whereas a gap in the narrow wall creates signal loss because a gap effectively creates an open circuit to the current flow.

In certain aspects, the issue of increased loss when the waveguide is split across the narrow wall versus the broad wall is frequency dependent. As the frequency increases, any small gap between the faces effectively represents a larger fraction of a wavelength and so increases the loss. It becomes increasingly difficult to clamp the waveguides together as the space required for clamping screws becomes small, and thus, gaps are more difficult to close. Aspects of the disclosure alleviate this issue by using a polarization rotator at a relative lower frequency (e.g., 125 GHz) and by keeping the polarization rotator as short as possible.

Figure 3:
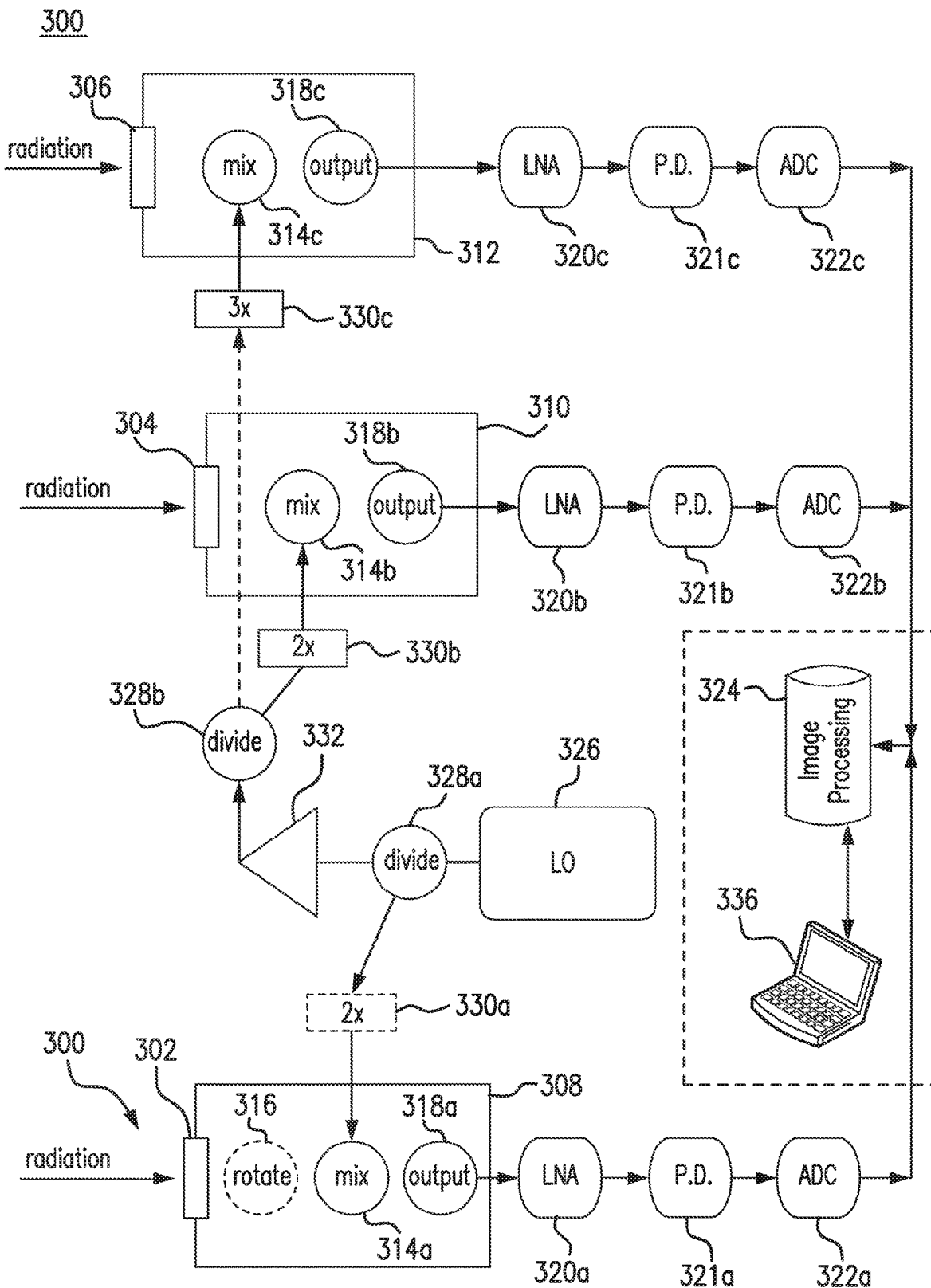
FIG. 3 is a schematic illustrating a system according to some embodiments.

Referring now to FIG. 3, a schematic depiction of a detection system 300 according to some embodiments is provided. Radiation can be received at inputs 302, 304, and 306, which may be feedhorns of block 308, 310, and 312, respectively. In some embodiments, block 308 may correspond to detector array 102, and blocks 310 and 312 may each form a part of detector array 104. The radiation signals received at inputs 302, 204, 306 are each passed to a mixer element, depicted as elements 314a, 314b, and 314c. In some embodiments, one or more of the received signals may be rotated before processing by a mixer, for instance, by optional polarization rotation element 316. The processed signals from the mixer, such as one or more intermediate frequency (IF) signals, are passed to the output (318a, 318b, 318c) of each block for subsequent, additional processing by a low noise amplifier (LNA) (320a, 320b, 320c), power detector (321a, 321b, 321c), and analog to digital converter (ADC) (322a, 322b, 322c). Additional processing may include filtering. The digital signals may then be passed to image generator 324 to form an image based on the detected radiation, such a composite image of an object or scene using the radiation received at 302, 304, and 306. The image processing 324 may be coupled to, or part of, a viewing system 336, such as a computer or monitor. In some embodiments, the IF signals are outputted using coaxial cable within each block.

Although this system is depicted with three mixer elements or inputs, it could be implemented with more or less. For instance, the system 300 could be extended to include a fourth set of input feedhorns, each with a corresponding set of mixers and processing circuitry.

In some embodiments, the local oscillator (LO) signal is provided to the mixers of system 300 using fewer LO sources than mixers. For instance, in the example illustrated in FIG. 3, a single LO source 326 provides an LO signal to each of mixers 314a-c. According to embodiments, this is accomplished using one or more power dividers 328a, 328b, and in some instances, one or more frequency multipliers 330a-c, such as doublers or triplers. For example, an original LO signal from source 326 could be provided to divider 328a, which in turn provides signal to divider 328b and an optional multiplier 330a. The multiplier 330 may be used to provide mixer 314a with an LO signal at a higher frequency than is provided by source 326. Similarly, divider 328b may provide signal to optional multipliers 330b and 330c for mixers 314b and 314c. In this respect, each of blocks 308, 310, and 312 can be configured for operation at different frequencies/wavelengths. Such configuration could include, for instance, the mixer design as well as the shape and dimensions of the input feedhorns (e.g., 116, 118, and 120). Accordingly, different wavelength radiation signals may be detected, processed, and used by the processing circuitry 324 to form a composite image using data at multiple wavelengths. One or more amplifiers, such as amplifier 332 may be used to boost a signal between a source, divider, multiplier, and/or mixer. Other amplifiers are not illustrated in the example of FIG. 3.

The feedhorn size should be selected to provide the most optimum coupling to the chosen optics, and the spacing should be selected to provide the optimum coverage depending on the application.

In certain aspects, components are optimized to minimize the amount of LO power reflected from the RF coupling circuit over as wide range of circuit operating conditions as possible. This limits reflected LO signal propagating back into one or more LO power splitters, thus limiting interference between channels. To further reduce reflection issues, a 90 degree 3 dB hybrid power splitter such as a Magic-T or a 3 dB hybrid branch guide coupler could be implemented.

Figure 5A:
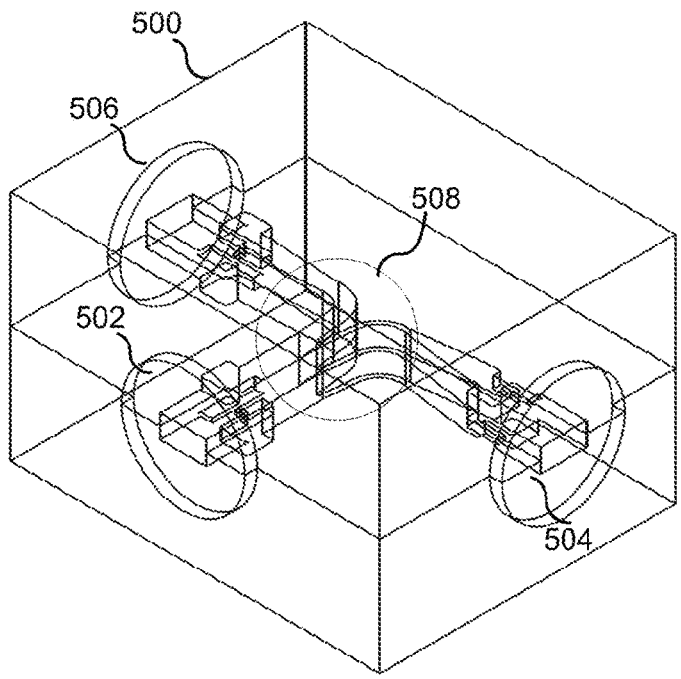
FIGS. 5A-5C illustrate rotation and splitting components according to some embodiments.
Figure 5B:
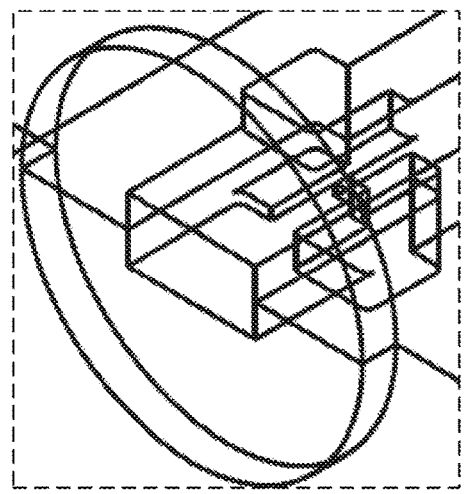
Figure 5C:
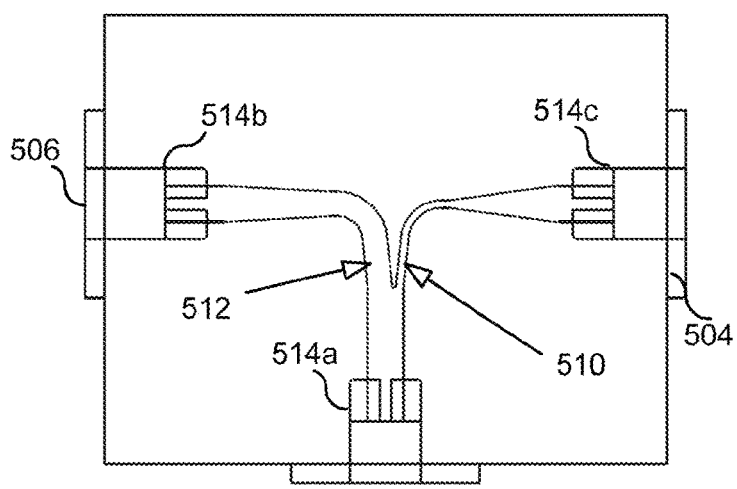

According to some embodiments, one or more of dividers 328a and 328b is a non-equal divider as described with respect to FIGS. 5A-5C. According to some embodiments, multipliers 330a and 330b are doublers while multiplier 330c is a tripler. In some embodiments one or more of the multipliers is not needed. For example, multiplier 330a may be omitted in some embodiments.

According to some embodiments, a common local oscillator source 326 is provided, multiplied in frequency using different order frequency multipliers (e.g., doublers and triplers), and subharmonic mixers are implemented. For example, mixers 314a-c may be operating in bands centered on the frequencies 125 GHz, 250 GHz and 375 GHz, respectively, which can use local oscillator frequencies of 62.5 GHz, 125 GHz and 187.5GHz. In this example, the base local oscillator source 326 may be a Gunn oscillator providing approximately 100 mW operating at 62.5 GHz. This is split into two equal signals using a splitter, such as divider 328a. This may be an equal power splitter, such as a standard magic-tee, or a non-equal splitter as described with respect to FIGS. 5A-5C. One half of the splitter output pumps the 125 GHz array (block 308 in this example), and the second half is input into a power amplifier (e.g., amplifier 332 in this example) to give a signal of approximately 400 mW that is then used to pump frequency multipliers 330b and 330c. Given the use of a subharmonic mixer at the example frequencies, the multiplier 330a is not required in this instance. In some embodiments, the system is optimized by using a configurable, non-equal power divider to provide the optimum power to the 125 GHz array and power amplifier. Each frequency mixer array requires similar local oscillator power, 30-40 mW in this example. However the typical efficiency of a doubler is 40% whereas a tripler is 15%. This means that use of an equal power splitter such as a magic-tee can result in too much power (80 mW) being generated for the 250 GHz array (e.g., block 310 in this example) and marginal power for the 375 GHz array (e.g., block 312 in this example). Traditional power splitters such as magic-tees rely on the input power being split equally in half, however, if such an approach is used for this embodiment, it results in too much power being supplied to the 125 GHz doubler (e.g., multiplier 330b) and not enough power being supplied to the 187.5 GHz tripler (e.g., multiplier 330c). Therefore in order to supply sufficient power to the tripler, which is typically less efficient than a doubler, the power amplifier would need to be over specified and the power to the doubler would be unnecessarily attenuated (otherwise it can be damaged). This is not only costly and wasteful of LO signal, but can be difficult to achieve with existing technologies and results in higher electrical bias power and heat removal requirements. Thus, and according to embodiments, a configurable power divider is used that can split the local oscillator pump power arbitrarily into two or more pathways, thereby dividing the power for each local oscillator arm's multipliers according to their respective power requirements. According to embodiments, dividers 328a and/or 328b are configurable. Thus, a system can be provided in which the overall system LO power requirement (and thereby cost) is minimized by matching the power split to each frequency arm so that the power delivered matches the peak efficiency input power requirement for each respective multiplier.

According to some embodiments, one or more blocks configured to receive and process radiation at a fourth frequency may be provided. For instance, one or more blocks may be configured at 500 GHz. The mixer for such a block could similarly operate using the same LO source, for instance, with an additional divider and or doubler in one or more of the LO paths shown in FIG. 3. In some embodiments, the block may be a sub-block or arrays 102, 104.

According to some embodiments, the LO source 326 may have multiple outputs at one or more frequencies, and initial divider 328a and/or multiplier 330a may not be required. In some embodiments, one or more of divider 328a and multiplier 330a are integrated into the local oscillator source 326, such that source 326 provides multiple frequency signals at configurable powers. Although two outputs are used by way of example, this implementation could be extended through the use of additional non-equal power splitters and/or multipliers.

Figure 4A:
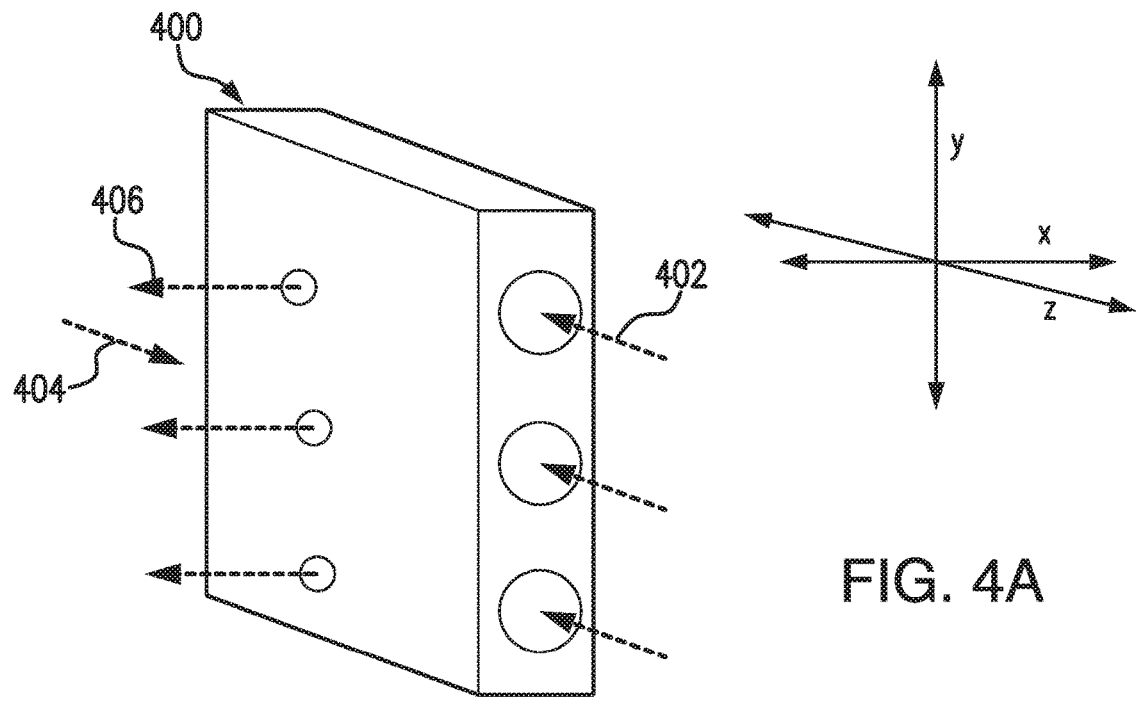
FIGS. 4A and 4B are diagrams illustrating blocks according to some embodiments.
Figure 4B:
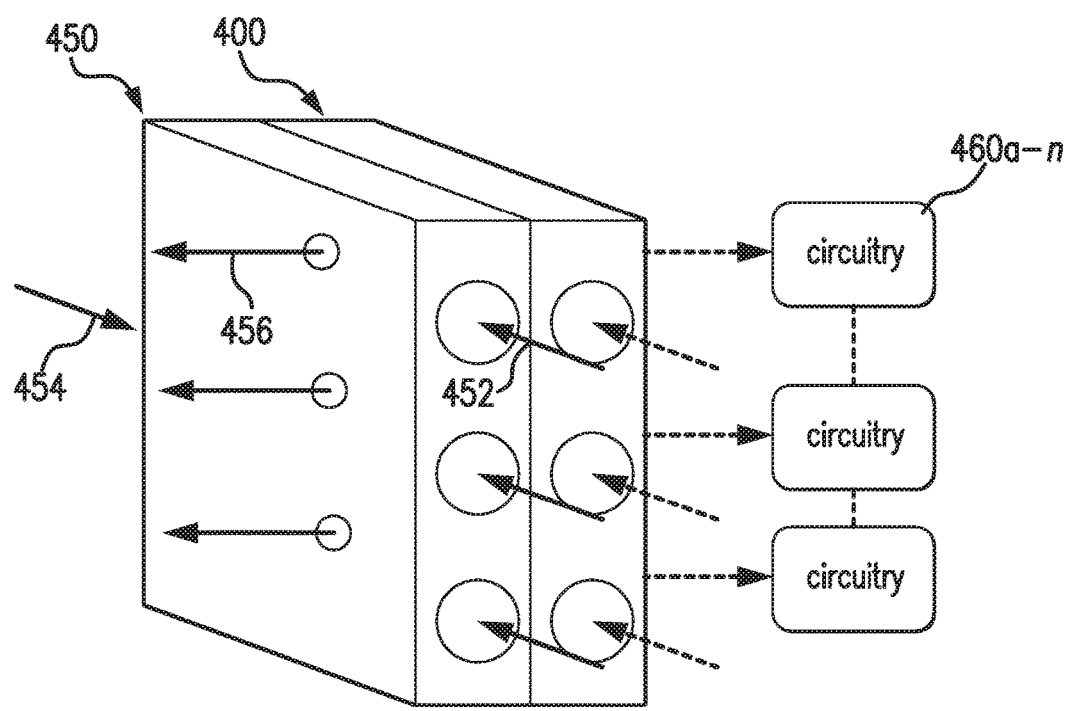

Referring now to FIGS. 4A and 4B, one or more detector array blocks are illustrated according to some embodiments. These may correspond, for instance, to arrays 102, 104 and blocks 308, 310, 312. An array, such as arrays 102,104 can be formed as a single block (e.g., as shown in FIG. 4A). Also, an array, such as arrays 102, 104, can be formed from multiple blocks (e.g., with two blocks as shown in FIG. 4B) to form a combined detection block with multiple rows and columns of feedhorns. Additionally, and according to embodiments, each sub-block can be formed from two parts as illustrated with respect to FIG. 12A, which shows the attachment of a half-block portion 1202 with another half-block portion 1204.

Referring now to FIG. 4A, a block 400 according to some embodiments is provided. In some instance, one or more of detector arrays 102, 104 may comprise block 400. Block 400 includes one or more signal inputs 402, one or more secondary inputs 404, and one or more outputs 406. For instance, signal inputs 402 may correspond to a plurality of detector feedhorns 116, 118, or 120 as illustrated in FIGS. 1A, 1B, 2, and 3. Similarly, the secondary input(s) 404 may be an LO signal input, such as described with respect to FIGS. 2A and 3. The output(s) 406 may be detected signal outputs, such as one or more IF signals from a mixer, as described in connection with FIG. 3. According to embodiments, the inputs are provided in the same plane while the outputs are provided in an orthogonal plane. In the example of FIG. 4A, the inputs 402,404 are provided along the z-axis while the outputs 406 are provided along the x-axis. Each of the inputs 402,404 extends along the z-axis through the block 400, while each of the outputs 406 extends along the x-axis through the block 400 in an orthogonal manner. According to embodiments, processing circuitry may be connected to the outputs 406. For example, a plurality of processing circuitry units may be in the y-axis direction to process the signals output from block 400. Likewise, additional blocks (e.g., 400) may be stacked in the y-axis direction to extend the detector. A similar arrangement is shown in FIG. 4B with circuit elements 460a-n. Such circuitry could include, for instance, one or more LNAs, wide-band power detectors, and/or ADCs as illustrated with respect to FIG. 3. In some embodiments, the power detectors are used to convert the broadband microwave power into base-band signals by thermal means (e.g., a bolometer) or by using an amplitude modulation (AM) detector. Additionally, the processing circuitry can include one or more filters, for instance, on either side of the LNA or ADC. According to embodiments, the power detector, such as 321a, 321b, 321c, detects power across the entire band, and outputs a voltage related to the power.

Referring now to FIG. 4B, and according to embodiments, a first block (e.g., block 400) can be combined with a second block (e.g., 450) to form a single detection array block, such as arrays 102, 104. In this example, the inputs 452 and 454 of block 450 extend along the z-axis and the outputs 456 extend along the perpendicular x-axis. Given the arrangement of the inputs and outputs, the processing circuitry 460a-n can be at the outer surface of the blocks 400,450 and stacked in the y-axis direction without interfering with signal capture from a source by inputs 452, or blocking delivery of the LO to input 454. Although the circuitry 460a-n is shown on the block 400-side of the array, the stack may also be provided on the other side of the array (e.g., the block 450-side). In this respect, a first stack 460a-n of processing circuitry may be provided on one side of the array, a second stack 4670a-n of processing circuitry may be provide on a second side of the array, an input signal (e.g., RF input) may be provided on a third side of the array, and in some embodiments, another input signal (e.g., LO) can be provided on a fourth side of the array. The circuitry 460a-n may comprise, for instance, one or more LNAs, AM (envelope) power detectors, and/or ADCs, and in some cases, filters. As illustrated in FIG. 4B, and according to some embodiments, there may be no inputs or outputs on either the top or bottom of blocks 400,450.

Although the array of FIG. 4B is depicted with two, connected blocks, embodiments are not so limited. For instance, according to embodiments, detector arrays, such as arrays 102,104, can be formed of blocks that are not directly connected, and with more than two blocks. For example, processing circuitry 460a-n could be interposed between two sub-blocks of an array (e.g., between blocks 400 and 450). In some instances, three sub-blocks could be used with circuitry interposed between the first and second block, and between the second and third block. In such an arrangement the circuitry between the first and second block could process signals from one or both of the first or second blocks, while circuitry between the second and third block could process signals from one or both of the second and third blocks. Additionally, another circuitry stack could be provided on one or more of the outer sides of the array, for instance, to process signals from the first or third block. While described using three blocks, according to embodiments, this arrangement could be repeated to extend the width of the array beyond three blocks. Detection arrays can also be expanded in the y-direction, for instance, by stacking additional blocks 400, 450. According to embodiments, there are no inputs or outputs on the upper and lower surfaces of an array block 400,450, and thus, it can be stacked with another block without interference. Some embodiments include a block 400,450 with six primary sides, with inputs and/or outputs exposed on outer sides (e.g., inputs and/or outputs in the x- and z-directions), but not on the top or bottom (e.g., in the y-direction). Stacking can be further improved with a notch 1206, as shown in FIGS. 12A and 12B.

According to embodiments, a detection system may be optimized for up to four detection frequency bands. For instance, each of arrays 102, 104 may comprise two blocks, such as block 400, 450, combined as illustrated in FIG. 4B. In this instance, each of the input feedhorns 452 and subsequent processing could correspond to a different frequency band, enabling multi-frequency detection of up to four frequency bands. According to embodiments, the width of the band may be set by a combination of the mixer, IF amplifier, and/or an envelope detector. In some embodiments, the band is +/−20% of the center frequency for the waveguide.

Referring now to FIGS. 5A-5C, the geometry of one or more non-equal power dividers and/or polarization rotators is illustrated according to some embodiments. As shown in FIG. 5A, a non-equal power divider 500 may comprise an input 502, with outputs 504 and 506. The power at output 504 may be different than the output at 506. Additionally, and as shown in the detailed view of FIG. 5B, one or more of the channels (i.e., input, first output, or second output) may include a polarization rotation element 508. Such rotation elements are further shown as 514a-c of FIG. 5C. As further depicted in FIG. 5C, the non-equal power division may be accomplished with two waveguide openings at the split. That is, a first waveguide opening 510 may be smaller than a second waveguide opening 512, such that more power is directed to output 506 than output 504. In this example, the waveguide power split is performed with a different polarization than the signal at the input 502 or outputs 504,506 due to the rotation elements 514a-c. In certain aspects, the power split ratio may be mostly linearly dependent on the relative height of the waveguide at the point where the waveguide splits. If the split is in half the waveguide height (the narrow dimension) then the power is split equally. If it is 20% of the height, for example, then the power is split 80:20, and so forth.

According to embodiments, and further referring to FIGS. 5A-5C, a non-equal configurable power splitter can be achieved through the integration of a polarizer rotator at each port. The bulk of the component can then be machined in a first orientation, for instance, with the waveguide spilt arranged to be in the center of the broad wall. Taken further, this approach can be exploited to provide the means to fully integrate the LO power network into a single, easy to CNC machine coupling manifold that can be used between power amplifiers and multipliers. In certain aspects, it provides the capability to arbitrarily rotate the waveguide orientation by 90 degrees depending on the overall system layout requirements. Such an LO network manifold can reduce cost, remove the need for flanges between components, and/or allow a much more compact system to be realized.

According to embodiments, a detection system provides temporally and spatially aligned multi-frequency data from an outdoor (or indoor) scene that is optimized to exploit the optimum characteristics of the Earth's atmosphere. In doing so, aspects of the disclosure provide for data that enables a degree of material specificity that can greatly aid the decision making process in determining the exact nature of a threat item. Because of the specific nature of human tissue, it can also be used to indicate human signatures in a cluttered outdoor scene in real time.

Earth's atmosphere provides unique illumination characteristics according to the observed frequency transmission through the atmosphere, which in turn is determined by the amount of water vapor present above the scene and the wavelength being used for detection. Two phenomena dominate this effect. Firstly, a water molecule has rotation resonances in the millimeter to terahertz domain so that at particular frequencies it absorbs photons. At frequencies away from these lines it passes photons, which may be understood as the water window. In addition, as the wavelength shortens the effective path length through the atmosphere becomes longer increasing the attenuation. At frequencies where the transmission is highest, Earth's atmosphere is transparent and so the cold background of space provides very high contrast during millimeter-wave detection. Thus, an outdoor scene under observation is dominated by the "cold" sky illumination. At frequencies where the transmission through Earth's atmosphere is low, the scene is dominated by the "warm" illumination from the column of air above the scene. According to embodiments, and in order to provide a color scene where different contrast types are achieved, a mixture of high transmission moderate transmission and low transmission wavelengths are required. Through experimental research, these have been determined to be ~35 GHz wide bands centered around 125 GHz, 250 GHz and 375 GHz.

According to embodiments, and to maximize utility, an image is generated in the shortest time, with the highest thermal sensitivity, and with the highest spatial resolution possible. The first two of these requirements are typically conflicting. The thermal sensitivity of a scene is governed by the equation.

$$\Delta T = T_{sys}/(t \times B)^{1/2},$$

where $\Delta T$ is the minimum resolvable temperature difference between spatially resolved regions. The variable $T_{sys}$ is the system noise temperature of the detector electronics, t is the time taken to collect the sample, and B is the bandwidth of the detector.

For the heterodyne detectors used in some embodiments, the system bandwidth is fixed, and thus, to improve the thermal sensitivity options are to reduce $T_{sys}$ and increase the integration time t. However, there may be little room for improvement of $T_{sys}$ other than by cooling the entire array, which could be impracticable. Increasing the integration time t is possible, but comes at the expense of the frame update rate. Thus, and according to embodiments, an improvement is provided that maintains the fastest frame rate by increasing the number of detectors. This then allows each detector more time to observe the scene. According to embodiments, the number of detectors can be increased in both the vertical and horizontal directions, and additionally, detector arrays can be paired with a plate interposed between. Moreover, a stackable multi-frequency detector configuration is described that can be scaled to incorporate an arbitrary number of detectors, in combinations of up to three or more frequency bands.

According to embodiments, polarizer elements and power dividers are integrated into the detection system. Acting in combination, these two components can enable a compact multiplexed optical feed system that provides near perfect spatial and temporal alignment of multi-frequency data retrieval. Embodiments also provide the means to scale the detector count by stacking the detectors in the vertical plane in a repeated manner.

Figure 6:
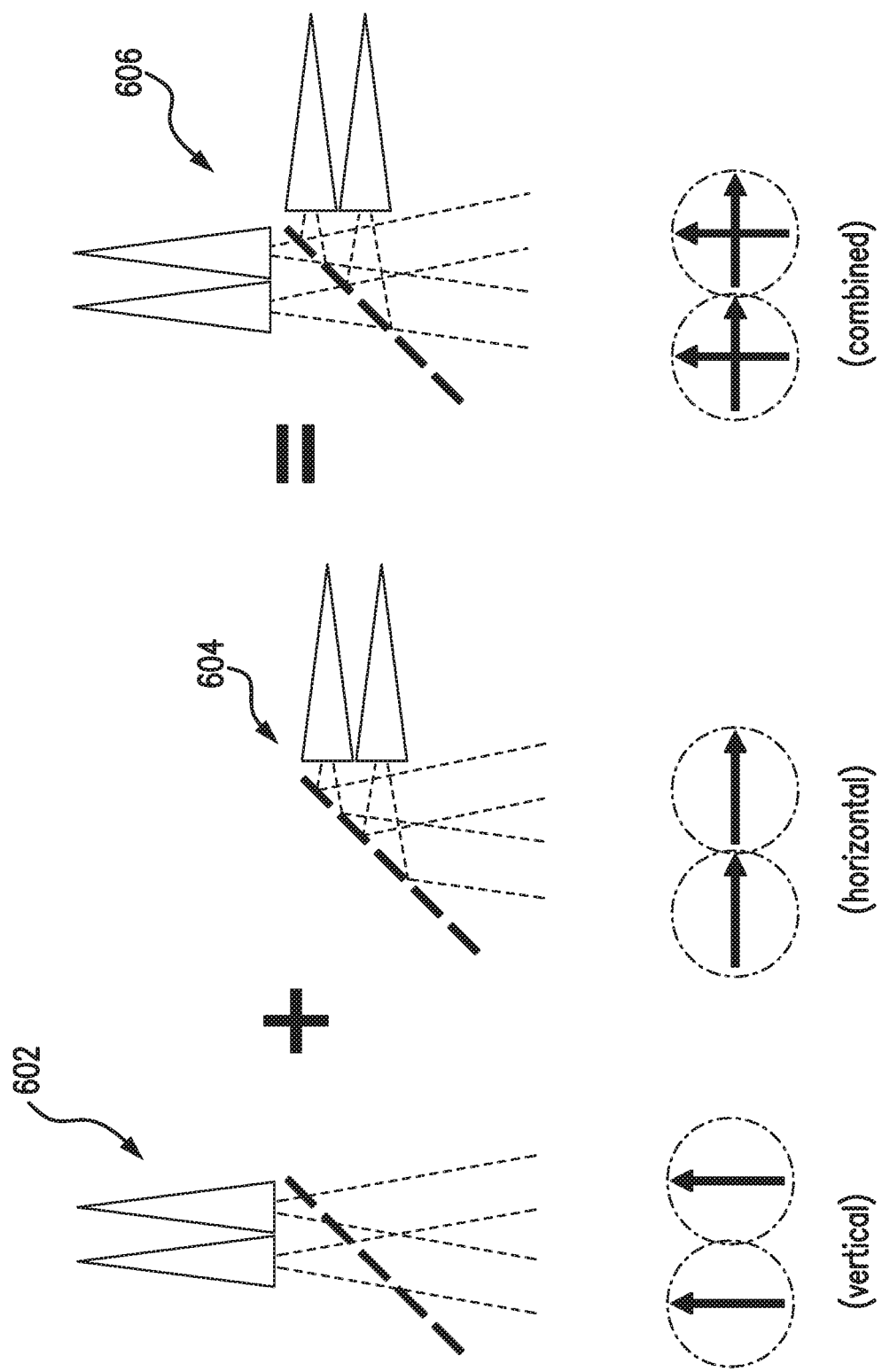
FIG. 6 is a diagram of image forming according to embodiments.

According to embodiments, in order to overlay each detector's field of view, a virtual array is formed using a linear polarizing grid placed very close to a detector array's feedhorns. A schematic is shown in FIG. 6, for example, which shows incident radiation passing through a linear polarizing grid at 602 to a first set of feedhorns, incident radiation reflecting to a second set of feed horns in 604, and the combination of the detected data as 606. In this example, the polarizing grid is completely transparent to vertically linearly polarized radiation but completely reflective to horizontally polarized radiation. When placed at 45 degrees between the orthogonal arrays (such as arrays 102, 104), the horizontally polarized radiation appears as a virtual array overlaying the vertically polarized array at 606. In this particular example, the terms "vertical" and "horizontal" are intended to distinguish orthogonal axes.

In practice a small amount of signal, typically 2-5%, is lost through scattering and ohmic loss in the wire grid beam combiner. By accepting this loss, a very compact and configurable feedhorn stacking arrangement can be realized. By overlapping or interspacing the feedhorns in each polarization output from the polarizing beam combiner, a completely versatile and configurable "virtual" 2D array is possible. This can be made up of multiple frequencies, multiple overlapping polarizations, or arbitrary array layouts such as sparse arrays. For instance, one array (e.g., 102) may be configured for a first frequency or set of frequencies, while a second array (e.g., 104) may be configured for a second frequency or set of frequencies. In this respect, multi-frequency detection can be accomplished with capture in two dimensions. Alternatively, both arrays (e.g., 102, 104) can be configured at the same frequency, such that vertically polarized radiation at that frequency is captured (e.g., 602) and horizontally polarized radiation at that frequency is captured (e.g., 604) to form a composite 606 for single-frequency detection. According to embodiments, the layout of this quasi 2D array can be designed for adaptive scanning. For instance, sparse arrays can be "filled" by dithering a scan mirror in small fast increments. Additional phenomenological information can be gathered through the combination of two polarizations.

According to embodiments, the use of a polarizing grid beam combiner with overlaying beams doubles signal collection for each position in the field of view.

Figure 7:
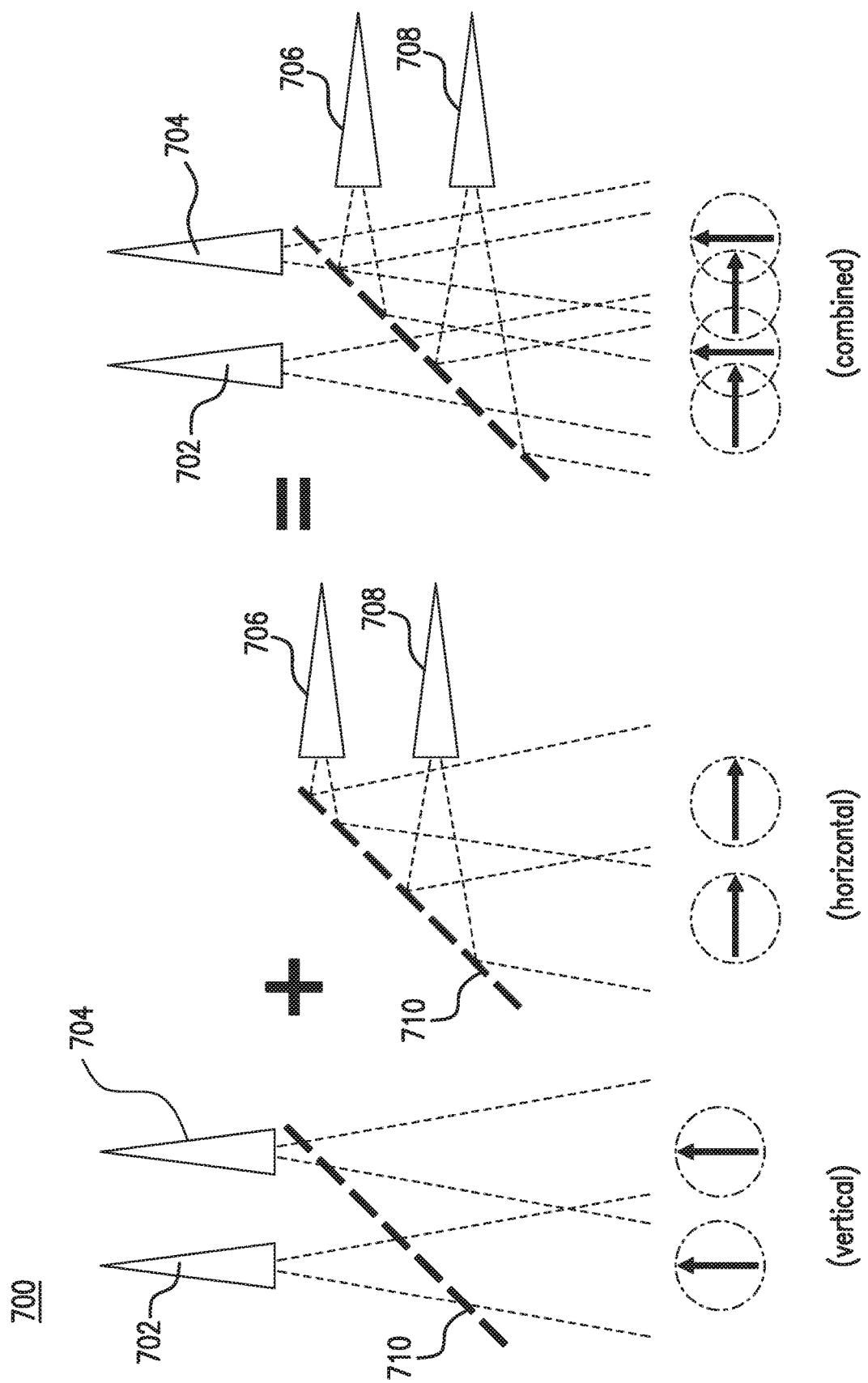
FIG. 7 is a diagram of image forming according to embodiments.

Referring now to FIG. 7, according to some embodiments, a detection system 700 is schematically illustrated relative to the polarization of received radiation. In this example, radiation from the field of view having a vertical polarization is passed through element 710 to feedhorns 702 and 704. At the same time, horizontally polarized radiation from the field is reflected from element 710 to feedhorns 706 and 708. As illustrated in FIG. 7, the detected data received on feedhorns 702, 704, 706, and 708 can be combined to form a composite representation of the field of view. According to embodiments, the feedhorns 702 and 704 are spaced apart from each other, as are the feedhorns 706 and 708. Accordingly, and as shown in FIG. 7, the horizontal and vertical signal information may be partially overlapping at the output.

According to embodiments, the detector layout of the system forms a sparse array.

According to some embodiments, the feedhorns 702, 704, 706, and 708 are all configured for the same wavelength radiation. By using the polarizing element 710 with two sets of arrays, the amount of usable, received and processed radiation is effectively doubled.

Figure 8:
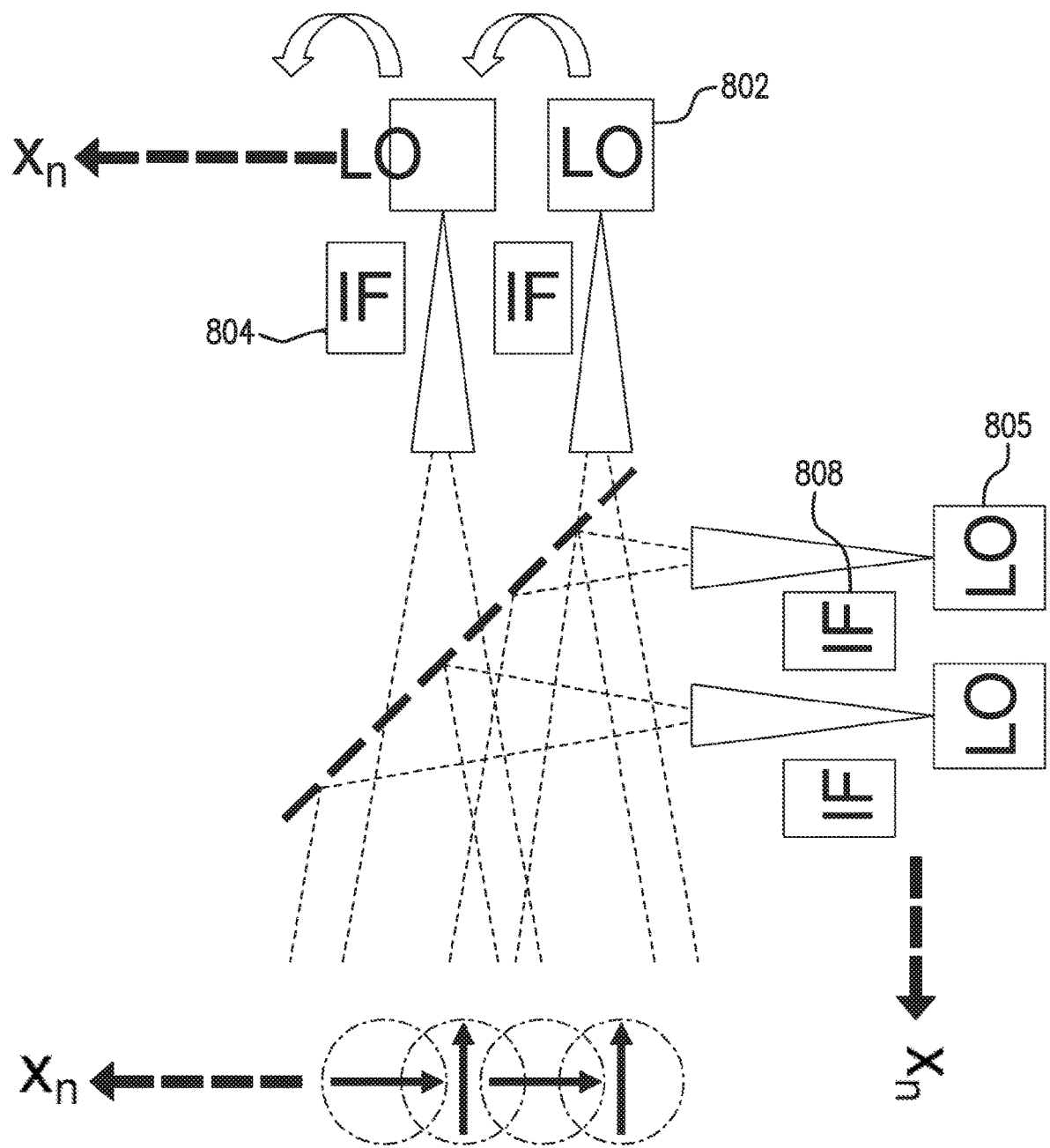
FIG. 8 is a diagram of image forming according to embodiments.

According to embodiments, the spaced-apart arrangement illustrated in FIGS. 7 and 8 can be applied in a multi-frequency detection system. That is, feedhorns 702, 704, 706, and 708 may be optimized for different frequencies.

Figure 9:
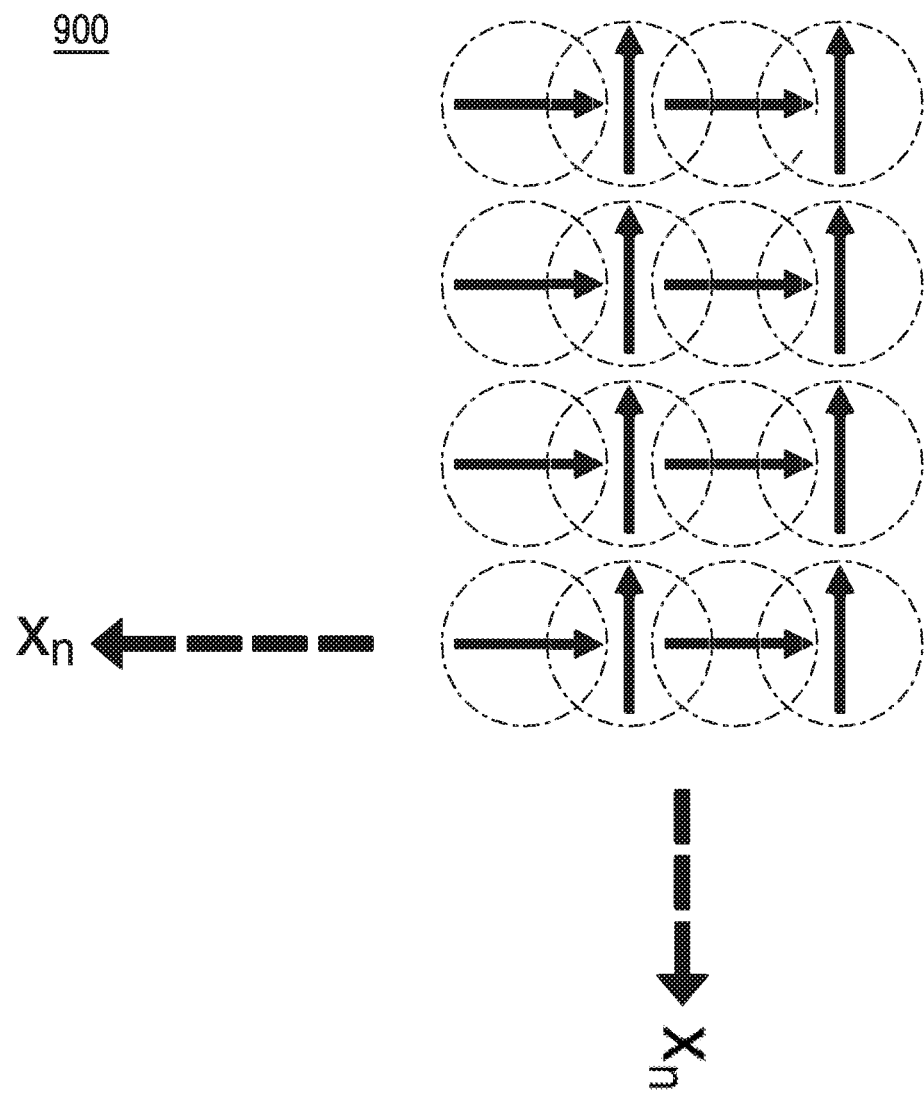
FIG. 9 is a diagram of image forming according to embodiments.

Referring now to FIG. 8, the system 700 is further illustrated according to embodiments with LO sources 802, 806 and IF processing circuitry 804,808. According to embodiments, because the feedhorns are sufficiently spaced apart, the IF processing circuitry 804,808 may be physically located between the feedhorns. Such circuitry may include, for example, one or more LNAs, power detectors, and/or ADCs. This may be done, for instance, using the orthogonal channel arrangements illustrated with respect to FIGS. 4A and 4B. With this setup, the width of the view Xn can be extended as far as needed for both the vertical and/or horizontal arrays. The height can also be set to a desired height, for instance, through stacking of blocks or variation of block height. This allows for a wide capture (increased number of feedhorns) without loss of temporal and spatial correspondence of the field of view. A resultant image depiction 900 from a pair detector arrays having a width of two and height of 4 spaced apart feedhorns is shown in FIG. 9. As is shown in the illustration of FIG. 9, the width and height of the arrays (and thus, the image capture) can be extended Xn in either dimension as needed. In some embodiments, the feedhorns are spaced apart by a distance defined by the size of circuitry interposed between the feedhorns. For instance, the feed horns may be placed at a distance equal to the size of the circuitry, 1.5× the size, or 2× the size.

According to embodiments, and as illustrated in the beam footprints of the combined split polarization elements shown in FIGS. 7-9, disclosed systems can create a "virtual" 2D imaging array that can be extended to n elements with alternating polarizations.

Figure 10:
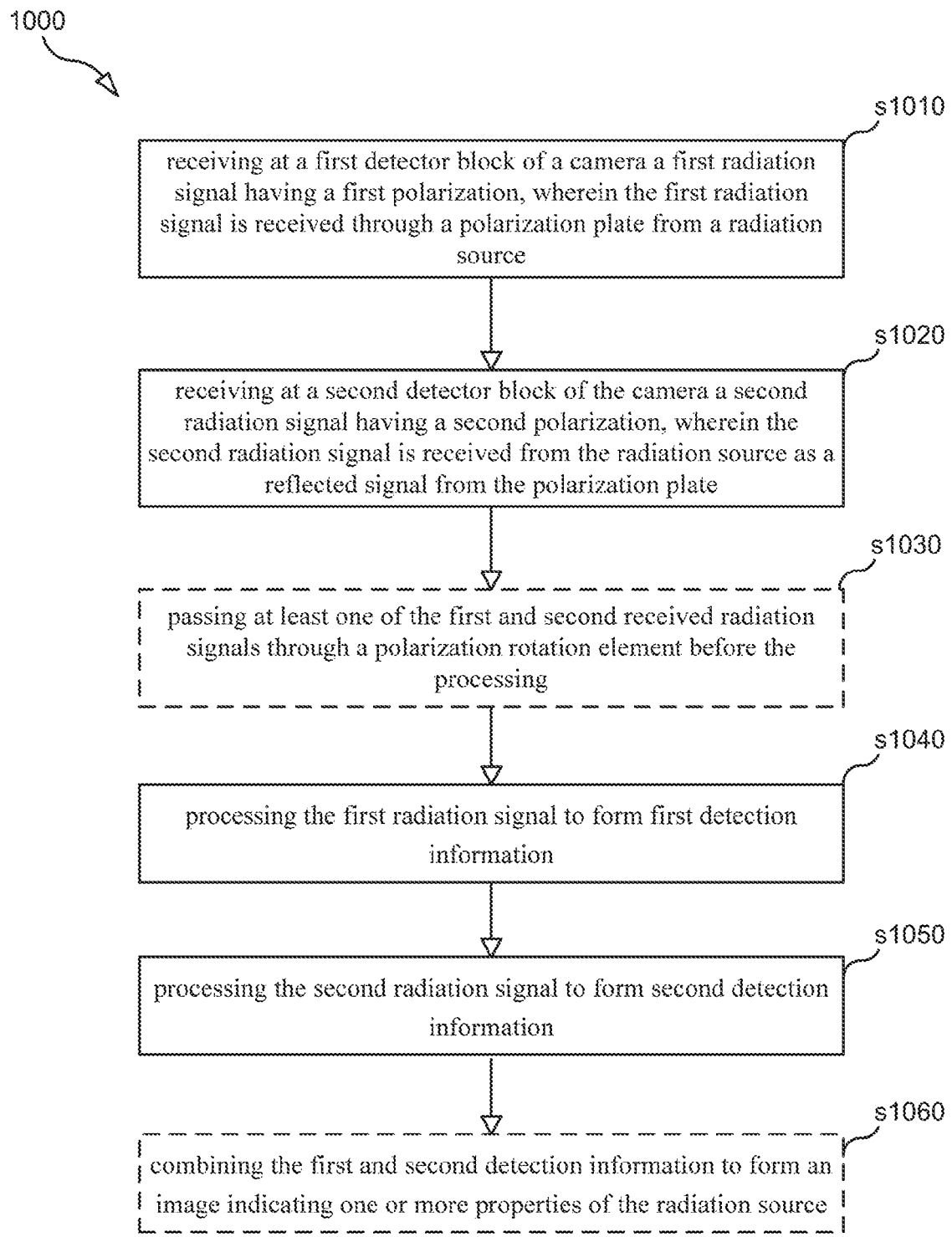
FIG. 10 is a flow chart illustrating a process according to some embodiments.

Referring now to FIG. 10, a detection method 1000 is provided according to some embodiments. The process may be performed, for instance, using a detection system as described with respect to one or more of FIGS. 1A and 1B, FIG. 3, and FIGS. 13A and 13B, according to embodiments. For instance, the process may be performed by a terahertz camera.

The method 1000 may begin with step s1010, which comprises receiving at a first detector block of a camera a first radiation signal having a first polarization, wherein the first radiation signal is received through a polarization plate from a radiation source. In step s1020, the process 1000 comprises receiving at a second detector block of the camera a second radiation signal having a second polarization, wherein the second radiation signal is received from the radiation source as a reflected signal from the polarization plate. In steps s1040 and s1050, the signals are processed, including processing the first radiation signal to form first detection information and processing the second radiation signal to form second detection information, for instance, as described with respect to FIGS. 3 and 4. This could include, for instance, passing the signal to a mixer, generating an intermediate frequency signal, and further processing the signal with one or more of an LNA, P.D., and ADC. According to some embodiments, the detection information is image data that can be used to construct a 2-dimensional image of at least a part of the field of view for which the detected radiation signals correspond, for example, as described with respect to FIGS. 6-9. In some instance, the detection information is a digital magnitude indicating the strength of the received radiation on a given channel.

In some embodiments, process 1000 includes optional step s1030, in which at least one of the first and second received radiation signals is passed through a polarization rotation element before subsequent processing.

In optional step s1060, according to some embodiments, the method 1000 further includes combining the first and second detection information to form an image indicating one or more properties of the radiation source. The combining of the detection information to form an image may be performed, for instance, by image processing 324 and/or a viewing system 326, as illustrated in connection with FIG. 3. In some embodiments, the combining is performed as described with respect to FIGS. 6-9

According to embodiments, a portion of the image corresponding to the first detection information (e.g., information generated from signals detected on a first feedhorn) and a portion of the image corresponding to the second detection information (e.g., information generated from signals detected on a second feedhorn) completely overlap in the image; or a portion of the image corresponding to the first detection information and a portion of the image corresponding to the second detection information partially overlap in the image; or a portion of the image corresponding to the first detection information and a portion of the image corresponding to the second detection information do not overlap in the image at all.

According to embodiments, a portion of the image corresponding to the first detection information and a portion of the image corresponding to the second detection information partially overlap or do not overlap at all in the image (i.e., do not completely overlap). In this example, the first detector comprises a first plurality of feedhorns having a first width and a having spacing equal to or greater than the first width, and the second detector comprises a second plurality of feedhorns having a second width and having a spacing equal to or greater than the second width. In this example, processing the first radiation signal can be at least partially performed on first processing circuitry located between two feedhorns of the first plurality of feedhorns, and processing the second radiation signal can be at least partially performed on second processing circuitry located between two feedhorns of the first plurality of feedhorns. Additionally, according to embodiments, the first plurality of feedhorns are arranged in an array of feedhorns having both a height and width greater than two, and the second plurality of feedhorns are arranged in an array of feedhorns having both a height and width greater than two.

According to embodiments, the processing elements can be adapted to color code image data generated at the different frequencies (and/or at different detector arrays) so that combined image data contains combined color coding from the image data generated at different frequencies. This combined color coding can be used to characterize surfaces. For example, reflective metal will appear to be at the temperature of the environment at both low and high frequencies, whereas skin will only appear to be at the temperature of the environment at lower frequencies. At higher frequencies it will appear to be at body temperature. The combined color coding from the different frequencies is likely thus to show skin as a different color from metal. Data can be assigned to pixels in images to identify areas having specified characteristics.

According to embodiments, the detector arrays deliver their analogue IF signals to one or more LNAs, AM detectors and digitizers, which ultimately convert the IF signals to digital signals and filter them. This may be, for instance, part of steps s1040 and steps s1050. In this example, the processing element (e.g., 324 and/or 326) takes the filtered digital signals from selected sets of the respective detectors, allocates an image color to each detector in a set, and then adds the signals for each pixel of an image signal 335 so that the pixels would be displayed in a color which is the combination of the colors received at the different frequencies for the selected set of detector channels. According to embodiments the arrays may not be aligned, such that some adjustment might be necessary to ensure the data they generate corresponds at least across a common area of interest in a field of view.

According to embodiments, the detection systems described herein can use a heterodyne mixer. For instance, the array of feedhorns deliver incoming radiation via waveguides to a diode-based mixer with an intermediate frequency (IF) output to processing circuitry. The feedhorns are scaled in size to give the same coupling factor to the waveguides according to frequency. In the mixer, the incoming signal is combined with a reference signal, for instance provided by a local oscillator (LO), which may incorporate a frequency control. The mixer can comprise a nonlinear element such as a Schottky diode that combines the radiation with an integer multiple of the reference signal to produce sum and difference signals, including an IF. According to embodiments, subharmonic mixers may be used. The IF signal is normally low in frequency relative to the received terahertz radiation and the reference signal, typically 0.1-40 GHz for the IF versus 100-500 GHz for the input radiation and reference LO signal. Because the IF signal is now relatively low frequency, it can be readily filtered, amplified, and envelope (AM) detected, to produce a voltage that is directly proportional in strength to that of the received terahertz radiation and can subsequently be used to form an image in relation to the field of view. According to embodiments, the envelope detection can be omitted. In certain aspects, one or more digitizers run at GHz (or tens of GHz) clock rates.

Figure 11:
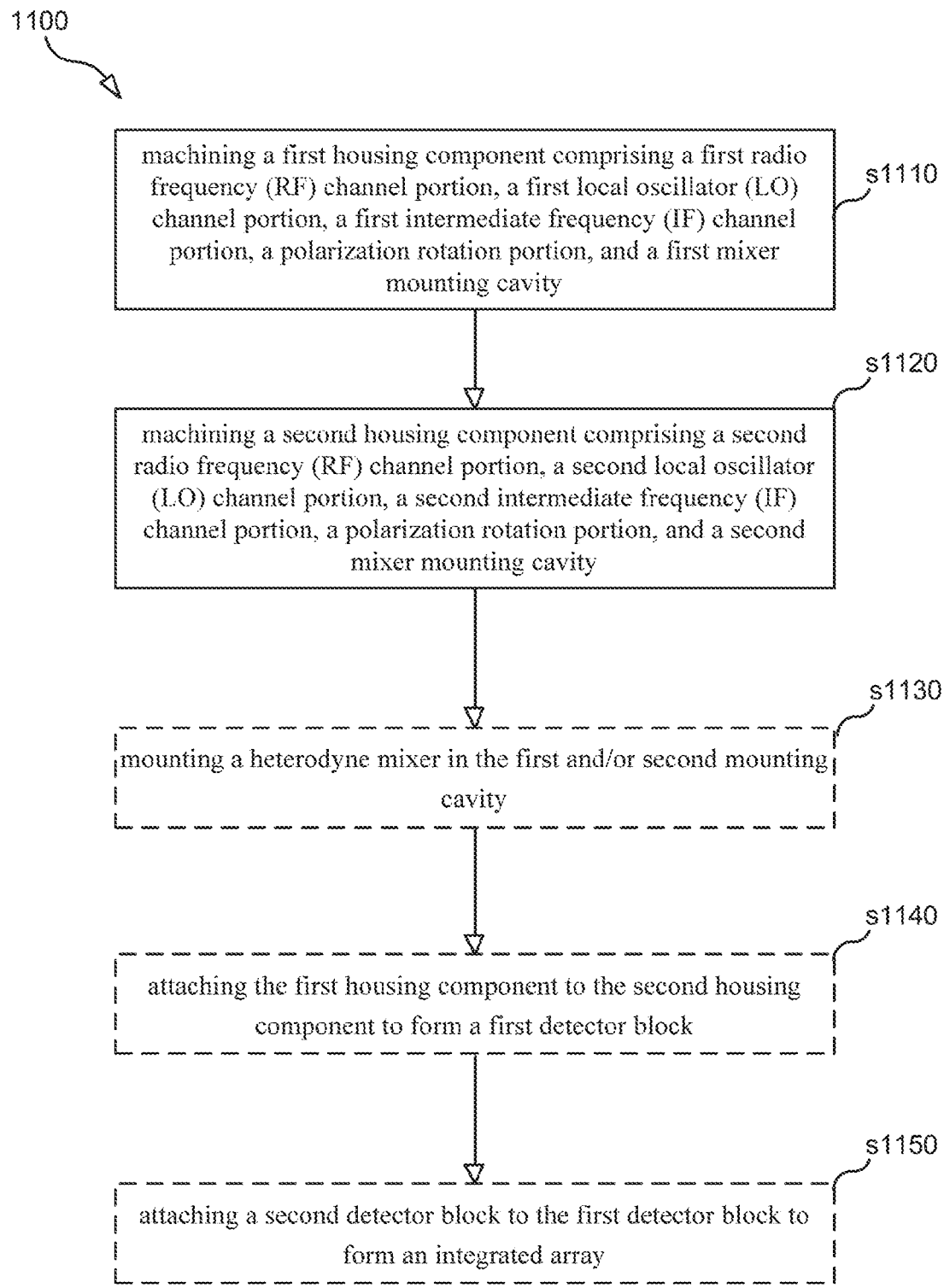
FIG. 11 is a flow chart illustrating a process according to some embodiments.

Referring now to FIG. 11, a manufacturing process 1100 is provided according to some embodiments. Process 1100 may be used, for instance, to manufacture one or more detector arrays 102,104 according to embodiments and/or one or more blocks as illustrated in FIGS. 4A and 4B. Similarly, process 1100 may be used to manufacture one or more elements (e.g., elements 1302 and 1304) of the system 1300 shown in FIG. 13A. FIG. 12A illustrates the combination of a first machined housing component 1202 with a second machined housing component 1204 according to some embodiments and process 1100.

The process 1100 may begin with step s1110, which comprises machining a first housing component comprising a first radio frequency (RF) channel portion, a first local oscillator (LO) channel portion, a first intermediate frequency (IF) channel portion, a polarization rotation portion, and a first mixer mounting cavity. Similarly, step s1120 comprises machining a second housing component comprising a second radio frequency (RF) channel portion, a second local oscillator (LO) channel portion, a second intermediate frequency (IF) channel portion, a polarization rotation portion, and a second mixer mounting cavity. In some embodiments, process 1100 includes optional steps s1130-s1150. In step s1130, a heterodyne mixer is mounted in the first and/or second mounting cavity. In steps s1150, the first and second housing components are attached to form a first detector block. In step s1150, a second detector block is attached to the first detector block to form an integrated block, such as array 102, 104 or block 400, 450. Attaching the first and second detector blocks may comprise attaching an outer surface of the first detector block to an outer surface of the second detector block, where the outer surface of the first detector block is formed in the same plane as the RF and LO channel portions and in a plane orthogonal to the IF channel portions.

In some embodiments, the first and second blocks are not directly attached, but rather, have processing circuitry interposed between them. Accordingly, the process 1100 may include a step of providing processing circuitry between the first and second blocks.

According to embodiments, process 1100 may be repeated to form one or more blocks on the first side of a polarizing plate, and then to form one or more blocks on the second side of a polarizing plate. Accordingly, the process 1100 may include placing a polarizing plate (e.g., at a 45 degree angle) between detector blocks.

Referring now to FIG. 12A, a block 1200 can be formed by attaching component 1202 and 1204. Block 1200 may be one or more of array blocks 102, 104, 400, and 450 or a sub-block of array blocks 102, 104, 400, and 450. As shown in FIG. 12A, the block 1200 may include a notch 1206. For instance, a first notch 1206a may be provided on a first surface 1208 of block 1200 (e.g., the lower surface), while a second notch 1206 is provided on an opposite surface (e.g., the upper surface). In some embodiments, the notches are angled. However, they may also be perpendicular to the block surface 1208 in other embodiments. As further shown in FIG. 12A, the first and second notches 1206a, 1206b can be aligned with each other. These notches may be used, for instance, to stack multiple blocks 1200 in order to expand an array size in the vertical direction, such as for arrays 102, 104 and system 100. This is illustrated, as an example, in FIG. 12B with blocks 1200 in a stacked arrangement. Block 1210 is stacked on top of block 1212 in this example, and may be identical stacking modules in some embodiments. Though illustrated with identical blocks having the same feedhorn size, blocks 1200 for different frequencies (and thus feedhorn sizes) may have the overall same shape and size, including one or more notches 1206, and thus can be stacked. In the examples of FIGS. 12A-12C, there are no RF inputs, LO inputs, or IF outputs on the surfaces comprising the stacking notches 1206. As shown in FIG. 12C, the blocks 1200 may be arranged to extend an array size in both the vertical direction (with ni blocks) and the horizontal direction (with $n_2$ blocks), for instance, as discussed in connection to FIGS. 6-9. Block 1200 may comprise signal inputs or feedhorns 1214, power inputs or LO channels 1216, and signal outputs or IF channels 1218. As shown in FIG. 12A, the inputs 1214, 1216 extend along a first axis, while the output 1218 extends along a second, perpendicular axis.

Figure 13A:
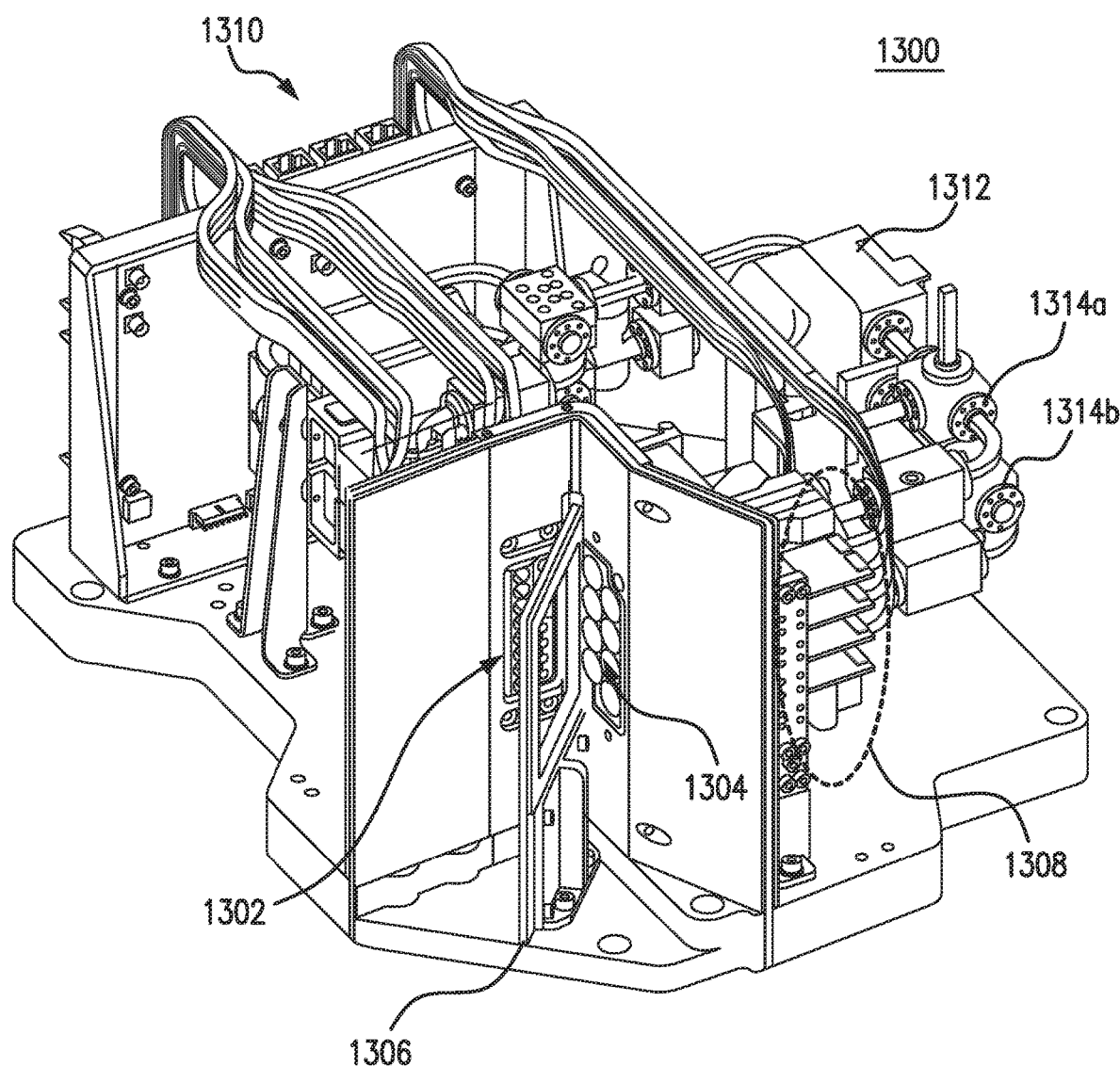
FIGS. 13A and 13B are illustrations of a system according to some embodiments.
Figure 13B:
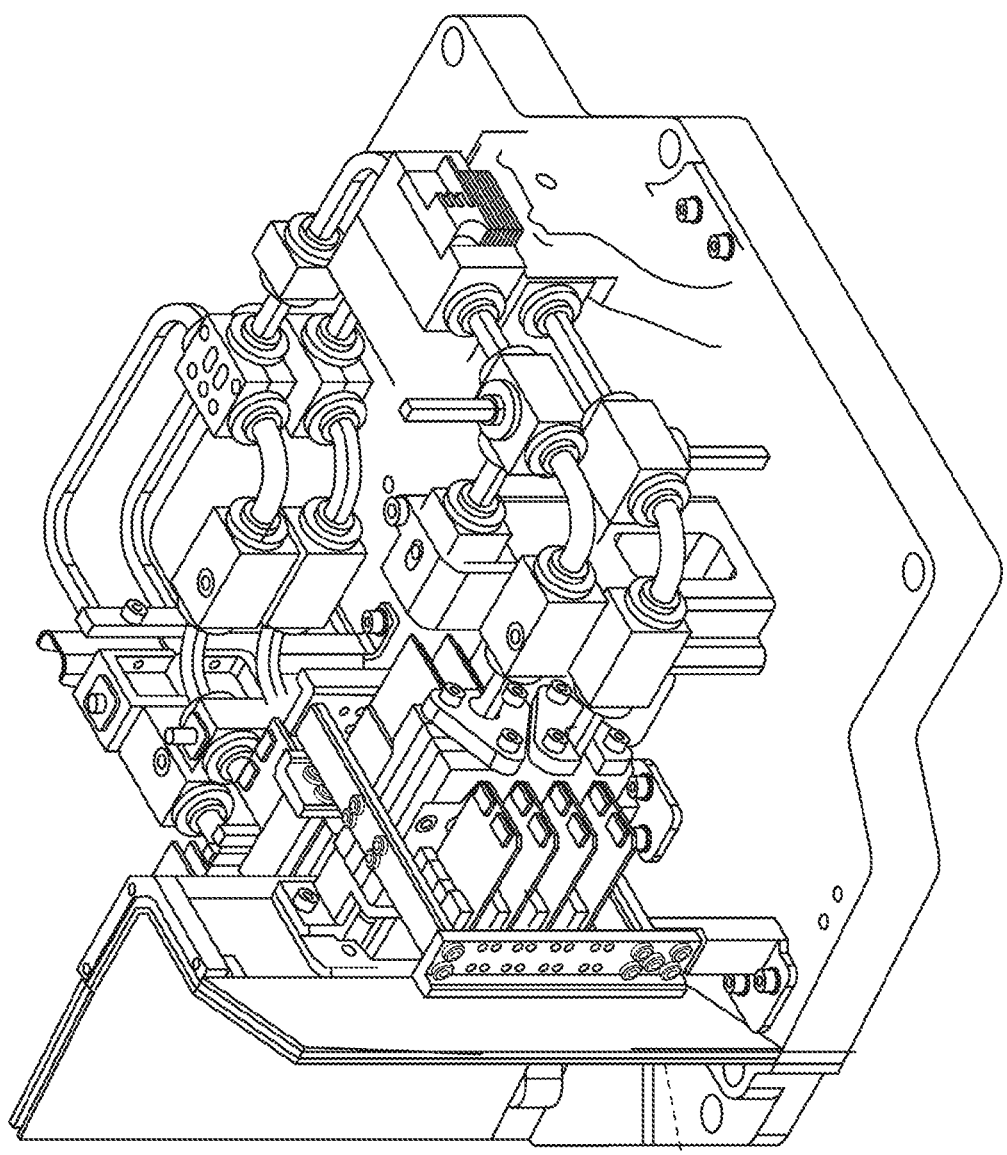
Figure 13B:
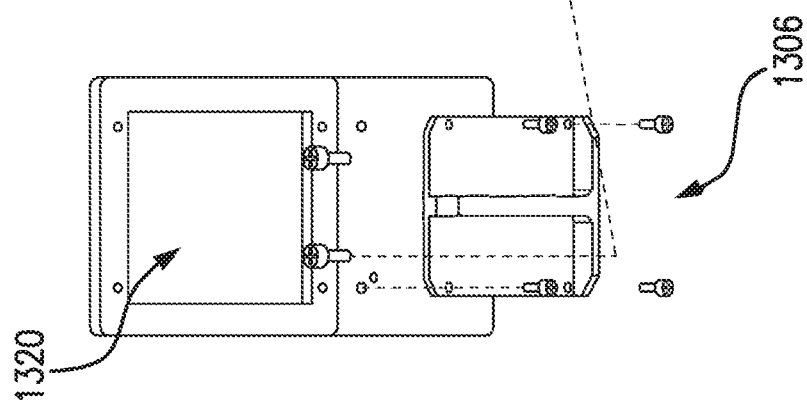

Referring now to FIGS. 13A and 13B, images of a detection system 1300 according to some embodiments are provided. As shown in FIG. 13A, system 1300 includes first and second detector arrays 1302 and 1304, with polarization plate 1306 interposed between. The processing circuitry 1308 is provided in a stacked configuration, with outputs to image processing 1310. The LO signal is provided by source 1312, with dividers 1314a and 1314b. FIG. 13B shows an alternative angle of system 1300, with a call-out of polarizing plate 1306 and a wire grid 1320 portion of the plate.

Although embodiments use 125 GHz, 250 GHz, 375 GHz, and 500 GHz as examples, other sets of frequencies may be used. For instance, 60, 120, 240, 360 and 480 GHz may be used. This set of frequencies relates to the absorption properties of oxygen in the atmosphere.

Aspects of this disclosure relate to a scanning method and apparatus for electromagnetic detection using the electromagnetic spectrum at wavelengths in the centimeter to sub-millimeter range. Certain embodiments may be applied in the high frequency or terahertz region of the electromagnetic spectrum, which has particular benefits for many applications, offering high resolution in small systems. The terms high frequency and terahertz in this context can refer the electromagnetic spectrum at wavelengths in the near millimeter, millimeter, and sub-millimeter range (e.g., 30 GHz-1 THz).

While various embodiments of the present disclosure are described herein, it should be understood that they have been presented by way of example only, and not limitation. Thus, the breadth and scope of the present disclosure should not be limited by any of the above-described exemplary embodiments. Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel. That is, the steps of any methods disclosed herein do not have to be performed in the exact order disclosed, unless a step is explicitly described as following or preceding another step and/or where it is implicit that a step must follow or precede another step.

What is claimed:

1. A detection system, comprising:
   a first detector block;
   a local oscillator (LO) source; and
   one or more intermediate frequency (IF) processing circuits,
   wherein the first detector block comprises:
      one or more heterodyne mixer elements;
      one or more LO waveguide channels configured to provide an LO signal from the LO source to the one or more heterodyne mixer elements;
      one or more waveguide feedhorns configured to provide detected radio frequency (RF) signals to the one or more heterodyne mixer elements; and
      one or more IF channels configured to provide IF signals from the one or more heterodyne mixer elements to the one or more IF processing circuits,
   wherein the one or more waveguide feedhorns and the one more LO waveguide channels extend along a first axis of the first detector block and the one or more IF channels extend along a second axis of the first detector block,
   wherein the first axis and the second axis are perpendicular,
   wherein the one or more waveguide feedhorns are exposed on a first face of the first detector block and an input of the one or more LO waveguide channels is exposed on a second face of the first detector block, and
   wherein the first and second faces are on opposite sides of the first detector block.

2. The system of claim 1,
   wherein the first detector block comprises a plurality of the heterodyne mixer elements, a plurality of the waveguide feedhorns configured in an array on the first face of the first detector block, and a plurality of the IF processing circuits, and
   wherein the plurality of IF processing circuits are arranged in a stacked configuration.

3. The system of claim 1, further comprising:
   a second detector block adjacent the first detector block, wherein the second detector block comprises a second plurality of heterodyne mixer elements and a second plurality of waveguide feedhorns configured in an array on a face of the second detector block.

4. The system of claim 3, further comprising:
   a second plurality of IF processing circuits, wherein the second plurality of IF processing circuits are arranged in a stacked configuration.

5. The system of claim 3, wherein the plurality of waveguide feedhorns of the first detector block are sized for a first frequency, and the second plurality of waveguide feedhorns of the second detector block are sized for a second, different frequency.

6. The system of claim 3, wherein at least one of the first and second detector block comprises a polarity rotation element.

7. The system of claim 3, wherein the LO source is coupled to the first or second detector block with a non-equal power splitter.

8. The system of claim 3, further comprising:
   a polarizing plate arranged to pass or reflect radiation to the first and second detector blocks.

9. The system of claim 1, wherein the IF channel comprises coaxial transmission line within the first detector block.

10. The system of claim 3,
    wherein the waveguide feedhorns of the first detector block are sized for radiation having a first center frequency, and the waveguide feedhorns of the second detector block are sized for radiation having a second center frequency,
    wherein the first center frequency is 250 GHz and the second center frequency is 375 GHz.

11. The system of claim 3,
    wherein the waveguide feedhorns of the first and second detector block are sized for radiation having the same center frequency.

12. The system of claim 11, wherein the center frequency is 125 GHz or 250 GHz.

13. The system of claim 3,
    wherein at least one of the IF processing circuits is located between two RF feedhorns of the first or second detector blocks.

14. The system of claim 3, further comprising:
    a third detector block; and
    a fourth detector block,
    wherein the third and fourth detector blocks are stacked on the first and second detector blocks.

15. The system of claim 14, wherein the third and fourth detector blocks are attached to the first and second detector blocks using one or stacking notches.

16. A detection system, comprising:
    a first detector array block; and
    a second detector array block stacked on the first detector array block,
    wherein the first and second detector array blocks each comprise at least one signal input that extends along a first axis, at least one power input that extends along the first axis, and at least one signal output that extends along a second axis,
    wherein the first axis and the second axis are perpendicular, and
    wherein the signal inputs for each of the first and second detector array blocks comprises at least two rows of feedhorns and at least two columns of feedhorns.

17. The system of claim 16, wherein at least one of the first and second detector array blocks comprises one or more angled stacking notches.

18. The system of claim 16, wherein the first and second detector blocks arrays are identical modular units.

19. A detection module for a scalable imaging system, comprising:
- one or more signal inputs;
- one or more power inputs;
- one or more signal outputs; and
- at least one stacking notch,
- wherein the signal inputs comprise one or more radio frequency (RF) feedhorns in a first plane, the power inputs comprise one or more local oscillator (LO) channels in the first plane, and the signal outputs comprise one or more intermediate frequency (IF) output channels in a second plane, wherein the first and second planes are orthogonal.

20. The detection module of claim 19,
- wherein the module comprises a first side, a second side, a third side, a fourth side, a fifth side, and a sixth side,
- where the one or more signal inputs are exposed on the first side, the one or power inputs are exposed on the second side, the one or more signal outputs are exposed on the third or fourth side; a first stacking notch is located on a fifth side, and a second stacking notch is located on the sixth side, and
- wherein the first and second sides are opposite sides of the detection module, the third and fourth sides are opposite sides of the detection module, and the fifth and six sides are opposite sides of the detection module.

\* \* \* \* \*